United States Patent [19]

Khan

[11] Patent Number: 5,274,832
[45] Date of Patent: Dec. 28, 1993

[54] SYSTOLIC ARRAY FOR MULTIDIMENSIONAL MATRIX COMPUTATIONS

[75] Inventor: Emdadur R. Khan, San Jose, Calif.

[73] Assignee: National Semiconductor Corporation, Santa Clara, Calif.

[21] Appl. No.: 592,954

[22] Filed: Oct. 4, 1990

[51] Int. Cl.$^5$ .......................................... G06F 15/347
[52] U.S. Cl. ................................ 395/800; 364/271.2; 364/258; 364/258.2; 364/276.8; 364/DIG. 1; 364/754
[58] Field of Search ............ 364/754, 845, 728.05, 364/841; 395/800

[56] References Cited

U.S. PATENT DOCUMENTS

| | | | |
|---|---|---|---|
| 4,493,048 | 1/1985 | Kung | 364/754 |
| 4,603,398 | 7/1986 | Bocker | 364/845 |
| 4,701,876 | 10/1987 | McCanny | 364/728 |
| 5,107,452 | 4/1992 | Karmarkar | 364/754 |
| 5,146,543 | 9/1992 | Vassiliadis | 395/27 |

OTHER PUBLICATIONS

S. Y. Kung & J. N. Hwang, "Parallel Architecture for Artificial Neural Nets," IJCNN, 1989, pp. II-165-II--172.
N. Ling & M. A. Bayoumi, "Algorithms for High Speed Multi-Dimensional Arithmetic and DSP Systolic Arrays," Proceedings of the 1988 International Conference on Parallel Processing, pp. 367-374.
S. Y. Kung & J. N. Hwang, "A Unifying Algorithm/Architecture for Aritificial Neural Networks," IEEE Magazine, Feb. 1989, pp. 2505-2508.

Primary Examiner—Eric Coleman
Attorney, Agent, or Firm—Limbach & Limbach

[57] ABSTRACT

A multidimensional systolic array processor uses a multidimensional array of systolically coupled processing elements to perform matrix-vector multiplication of matrix and vector signal sets. A two-dimensional array uses a P×Q matrix (P rows and Q columns) of processing elements which are coupled to systolically process the signals, e.g. via multiplication and accumulation. The processing elements are coupled both row-to-row and column-to-column for pipeline processing within each row and each column, i.e. multidimensional pipelining, thereby increasing processing parallelism and speed. Interconnectivity of the processing elements is minimized by forming separate column and row signal subsets of the vector signal set which are coupled simultaneously to each processing element in the first row and first column, respectively. Size of the processing elements is minimized by reducing local storage of matrix signal subsets within each processing element. Separate column and row signal subsets of the matrix signal set are formed and coupled into each processing element of the first row and first column, respectively. As the matrix column and row signal subsets are systolically processed and transferred row-to-row and column-to-column, respectively, each signal subset is reduced in size by one signal, thereby requiring the transfer and temporary local storage of successively smaller matrix signal subsets. A three-dimensional processor uses a P×Q×T array (T planes of P rows and Q columns) of processing elements which are coupled plane-to-plane-to-plane.

45 Claims, 18 Drawing Sheets

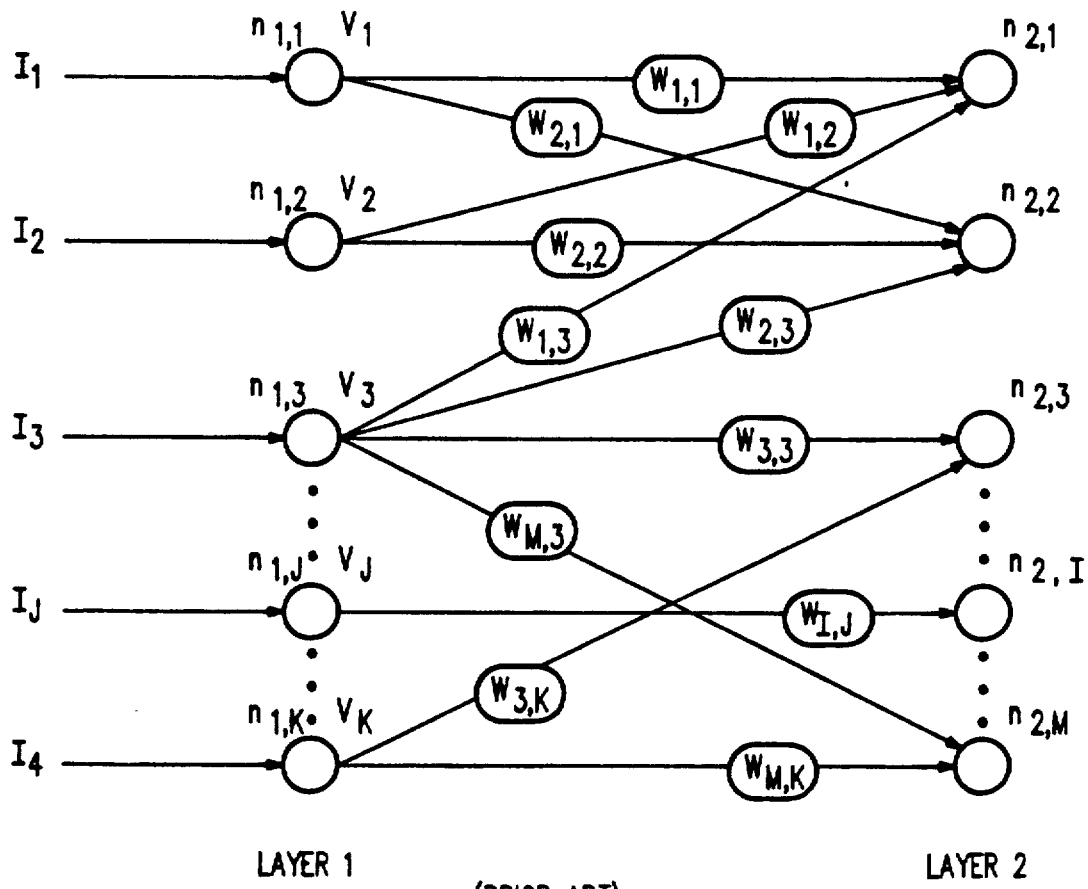
(PRIOR ART)
FIG. 1
(PRIOR ART)
FIG. 2

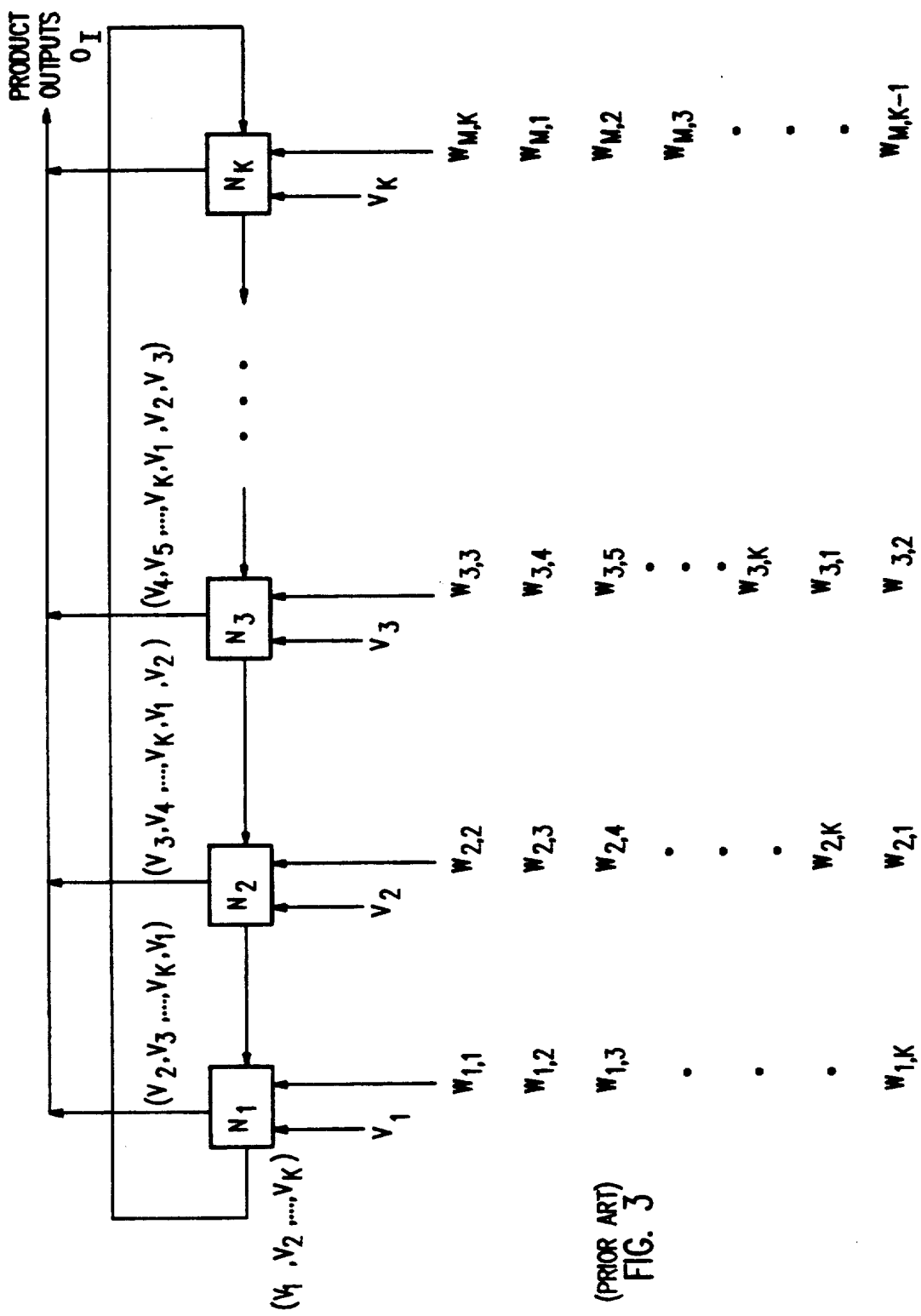
(PRIOR ART)
FIG. 3

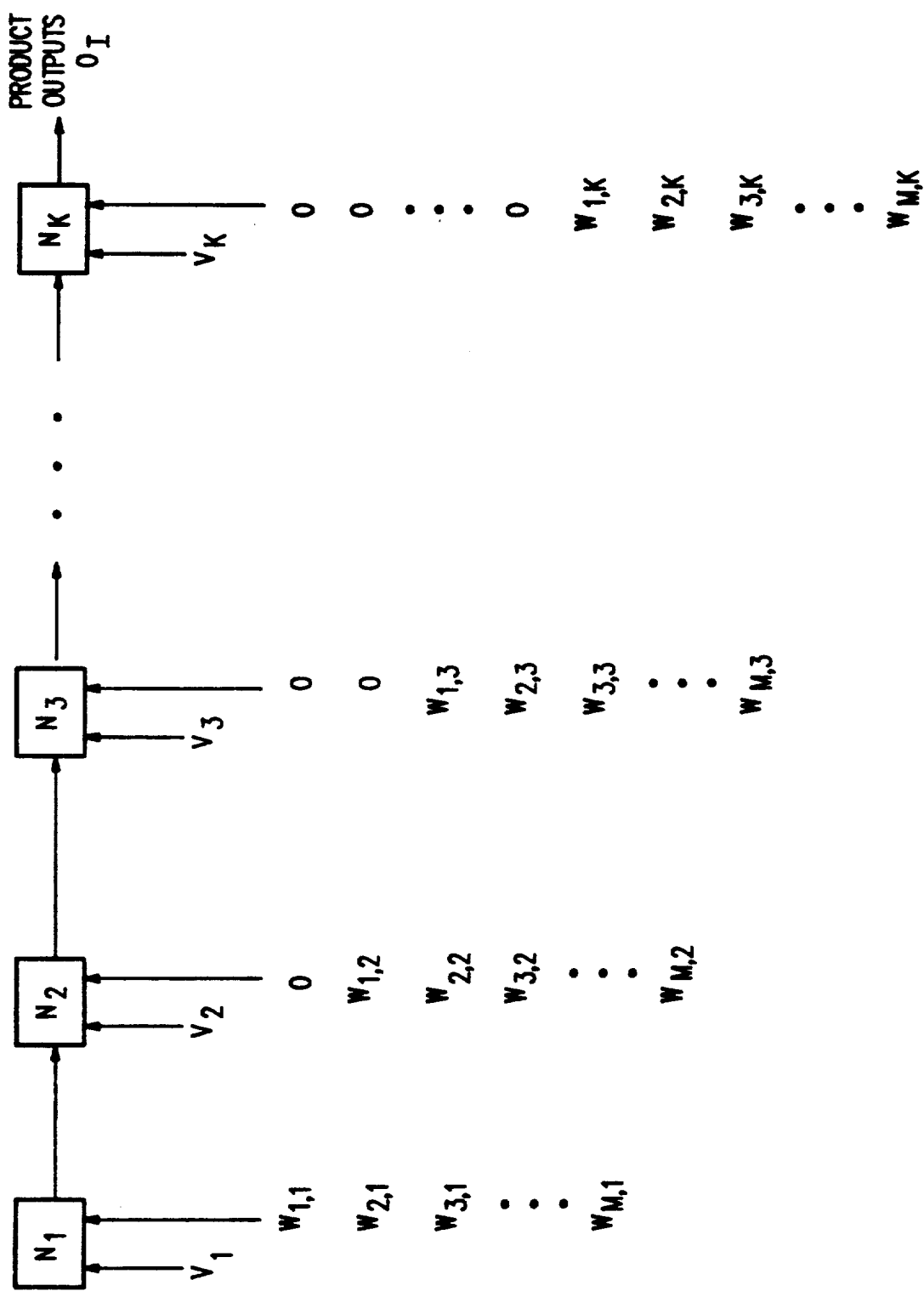
(PRIOR ART)
FIG. 4

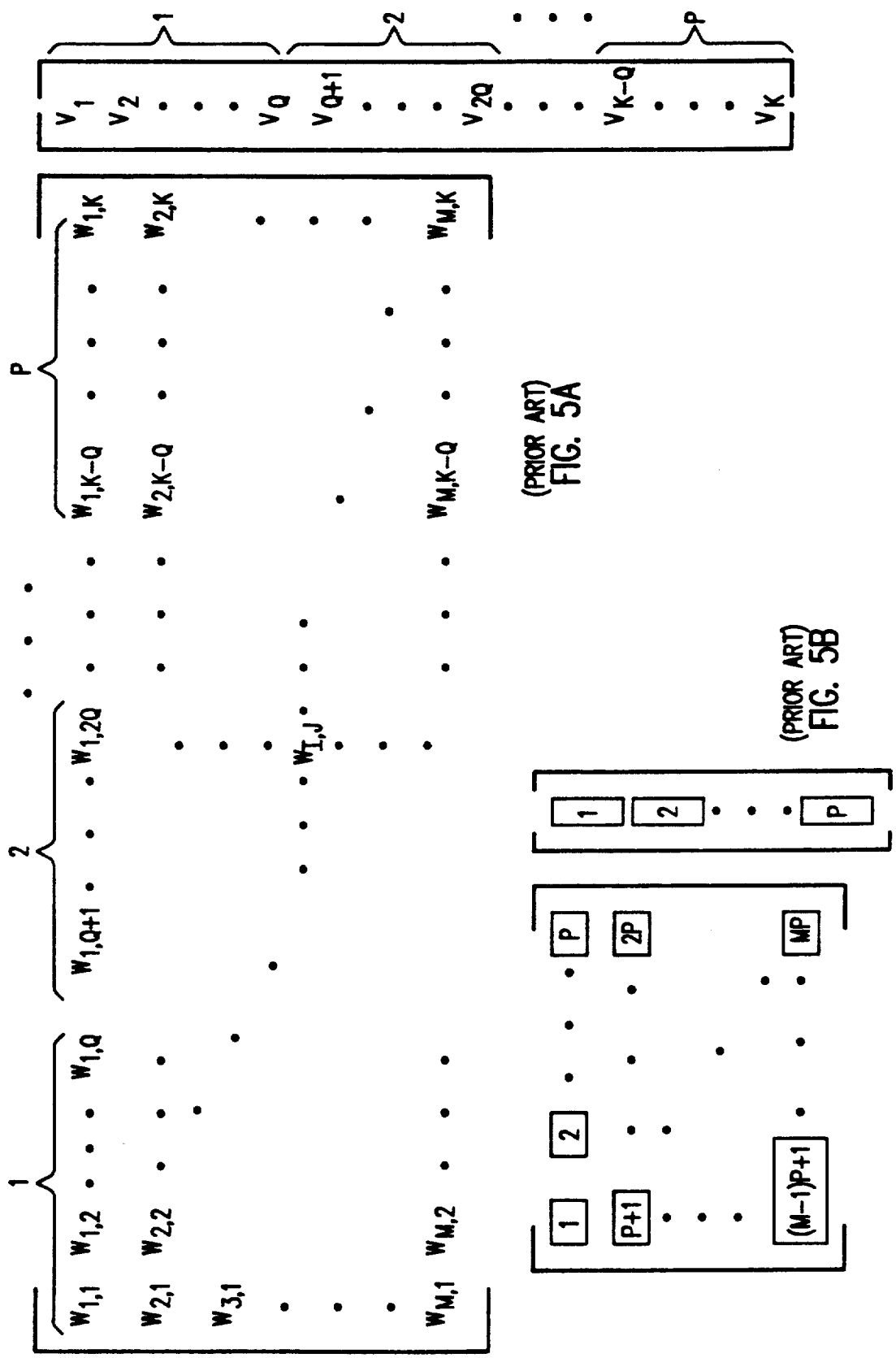
FIG. 5A (PRIOR ART)
FIG. 5B (PRIOR ART)

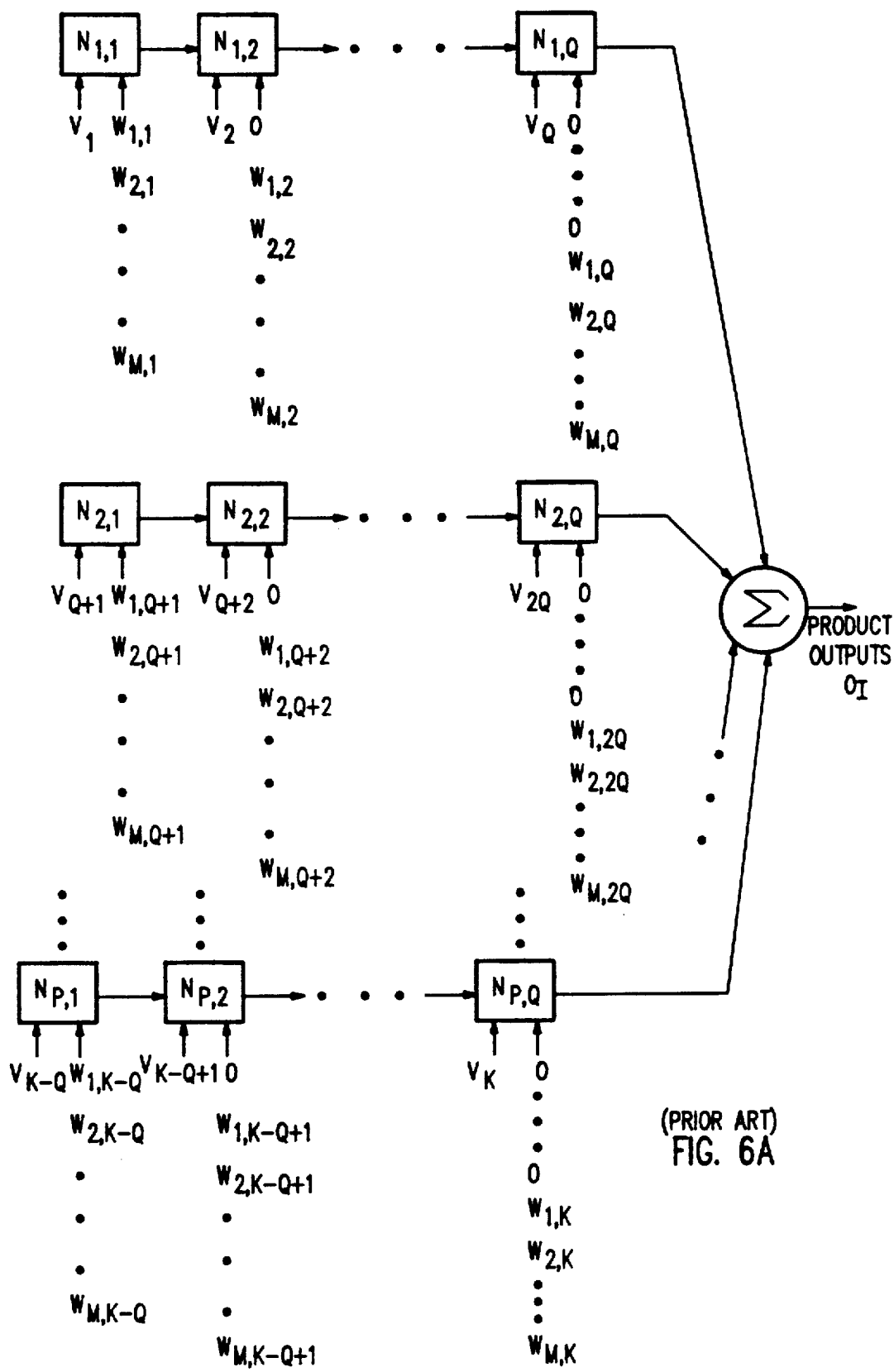
(PRIOR ART)
FIG. 6A

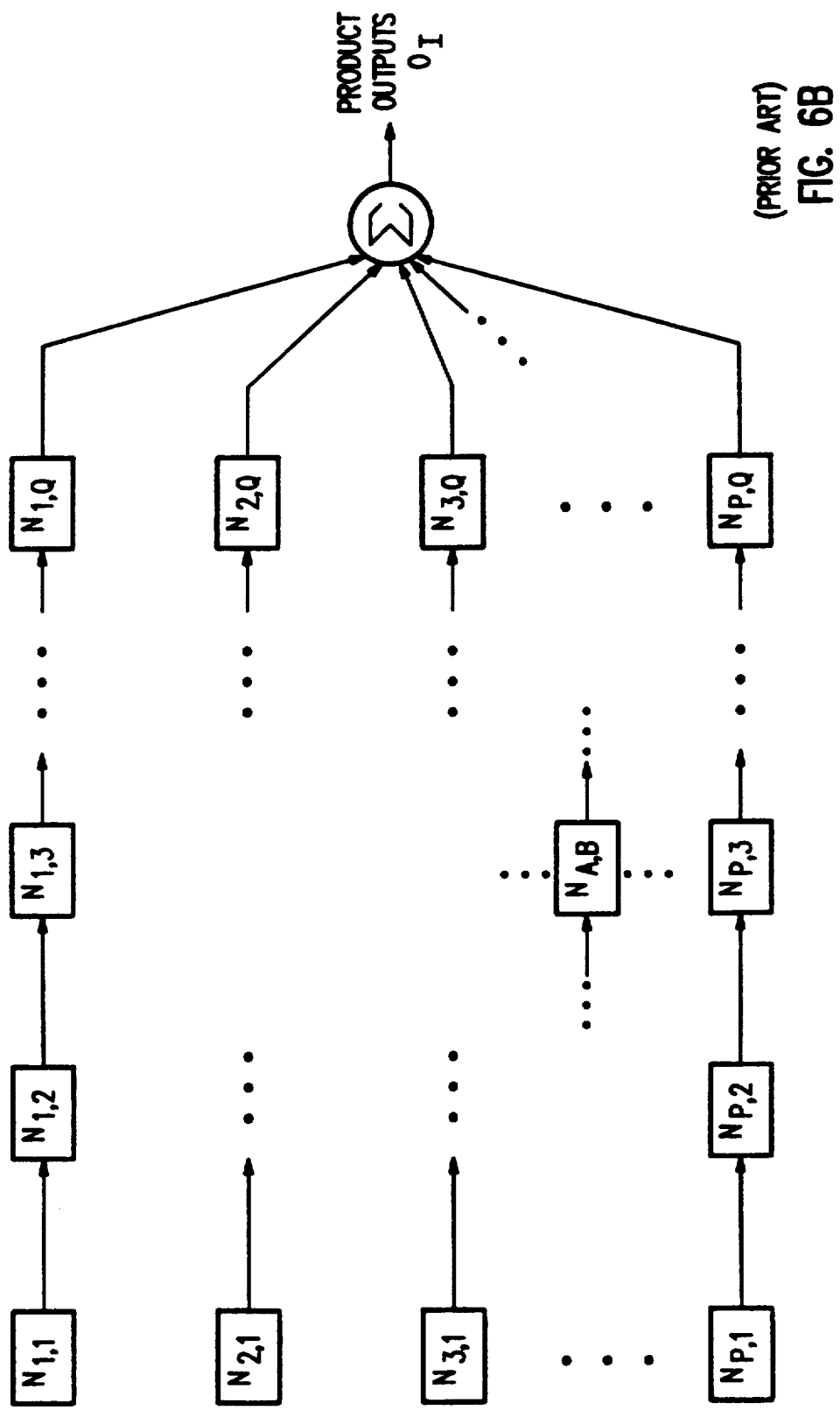
FIG. 6B (PRIOR ART)

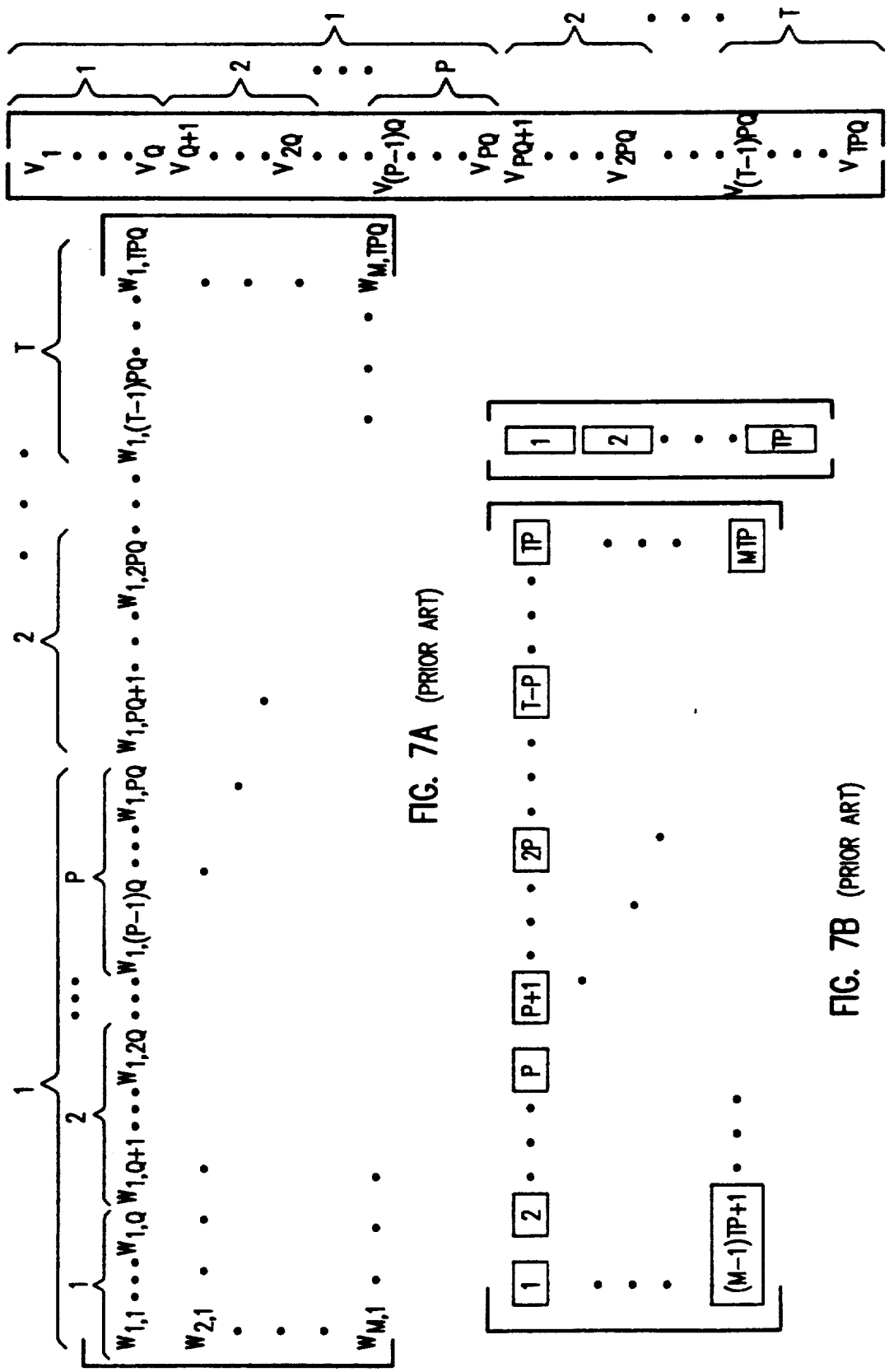
FIG. 7A (PRIOR ART)
FIG. 7B (PRIOR ART)

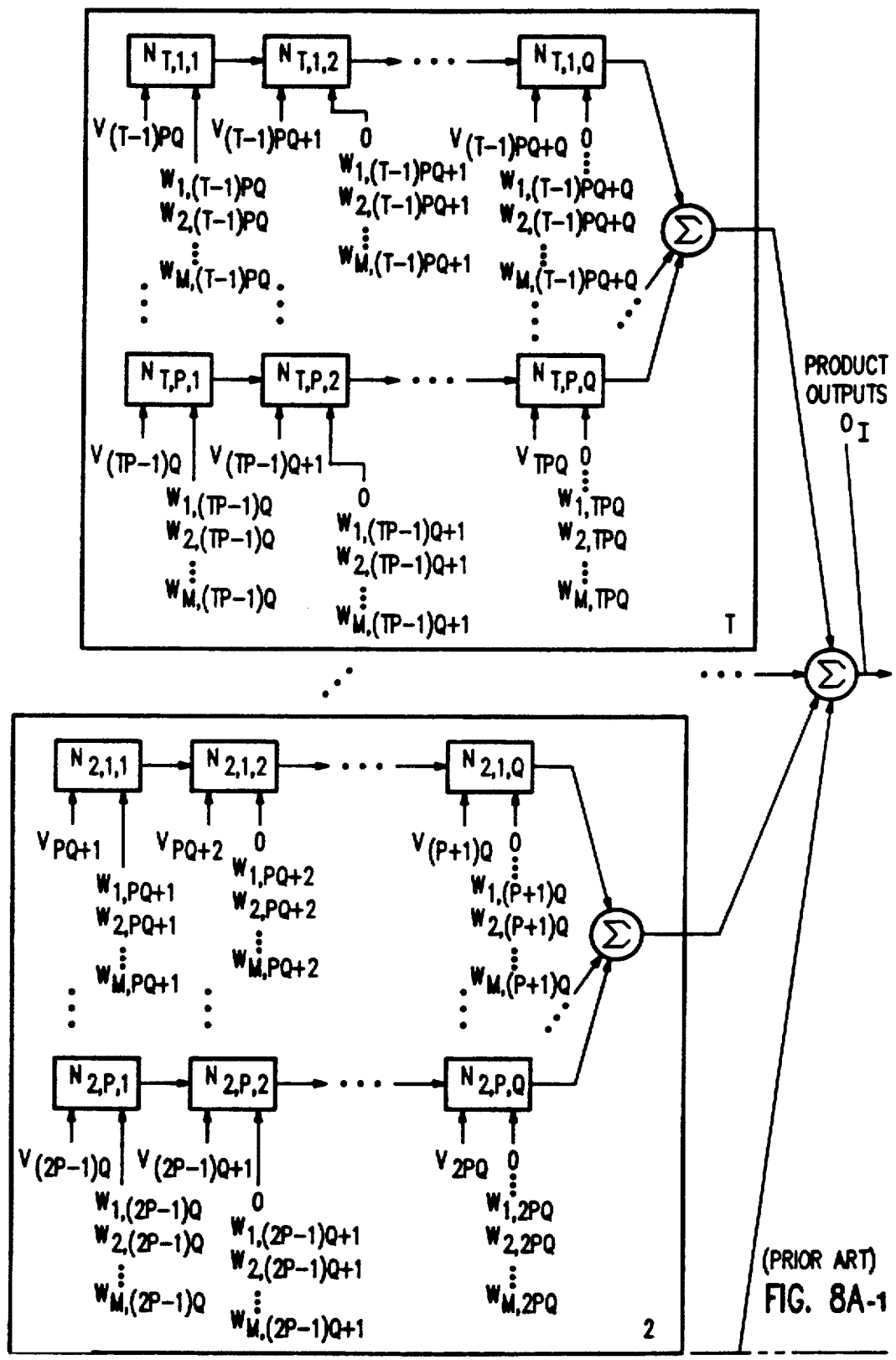
(PRIOR ART)
FIG. 8A-1

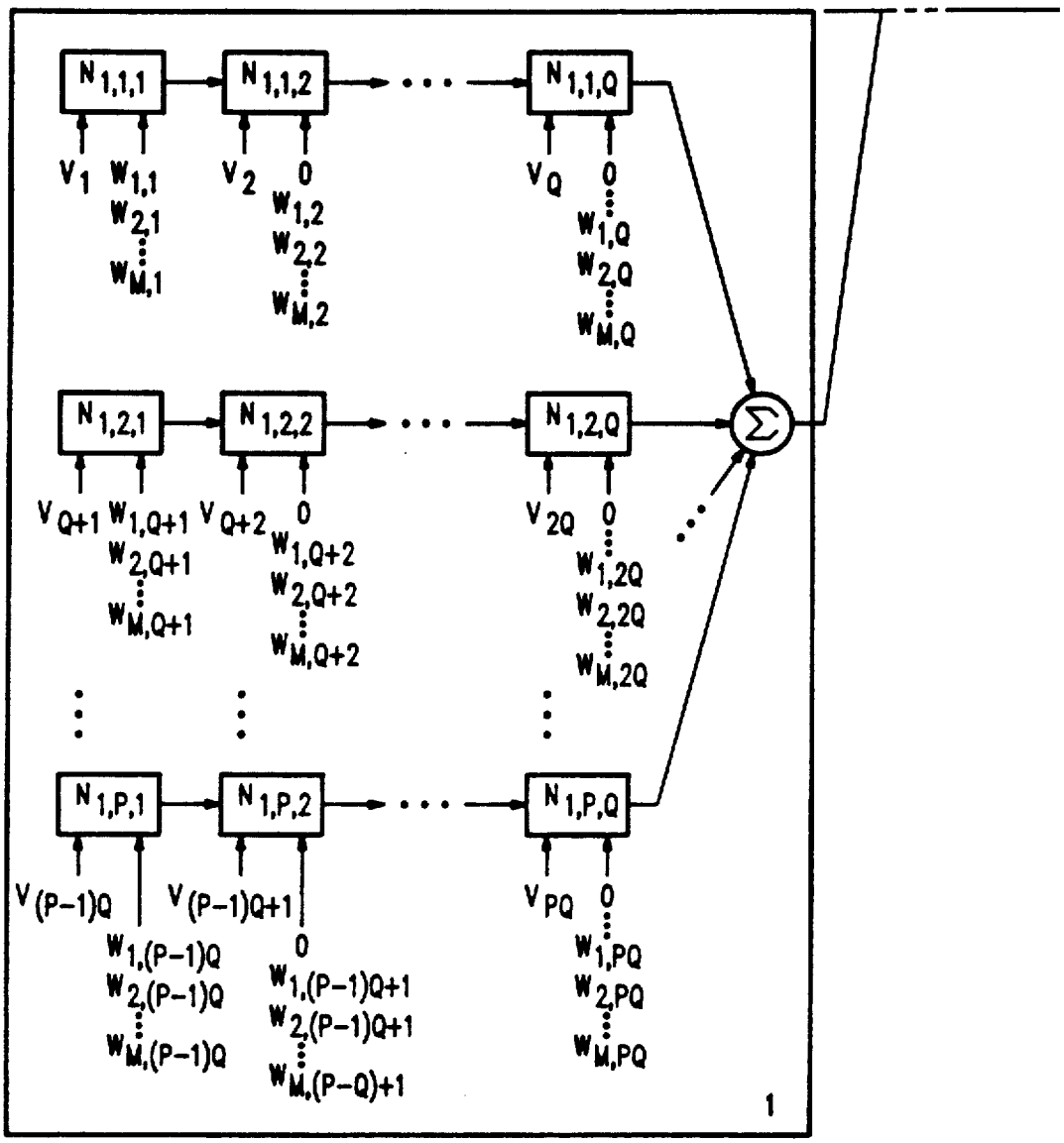
(PRIOR ART)
FIG. 8A-2
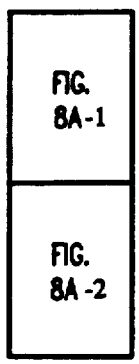
KEY TO FIG. 8A

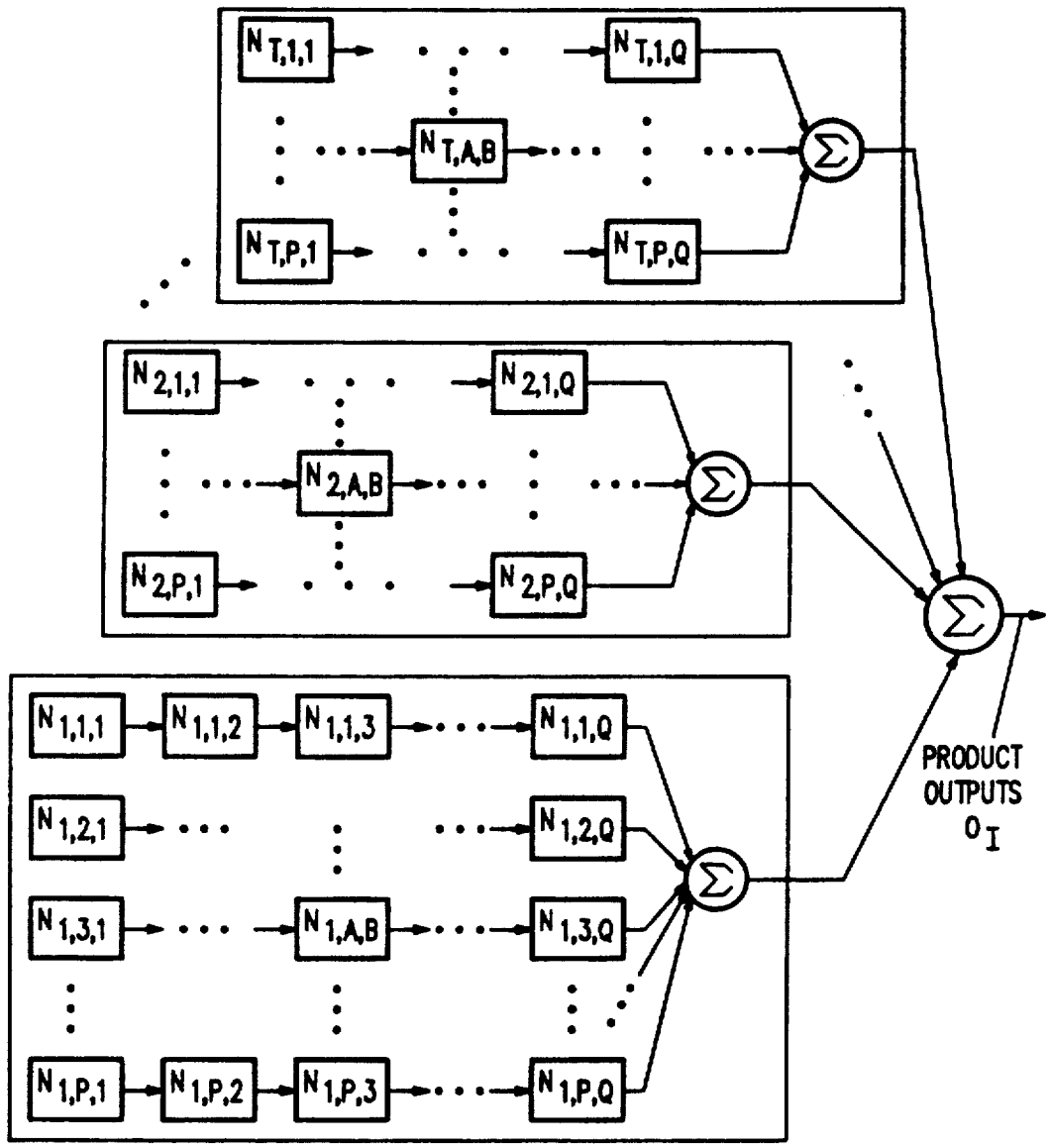
(PRIOR ART)
FIG. 8B

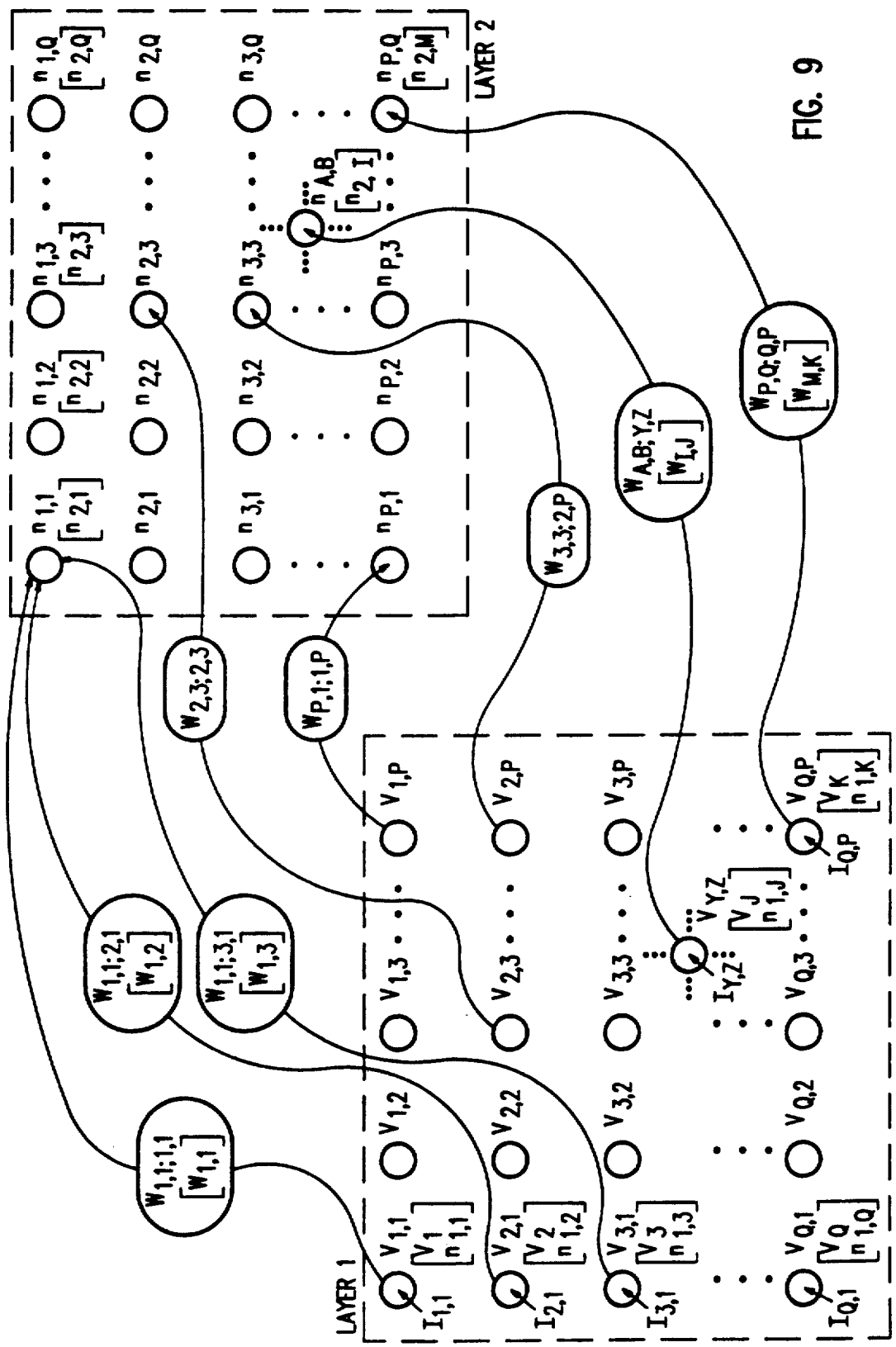
FIG. 9

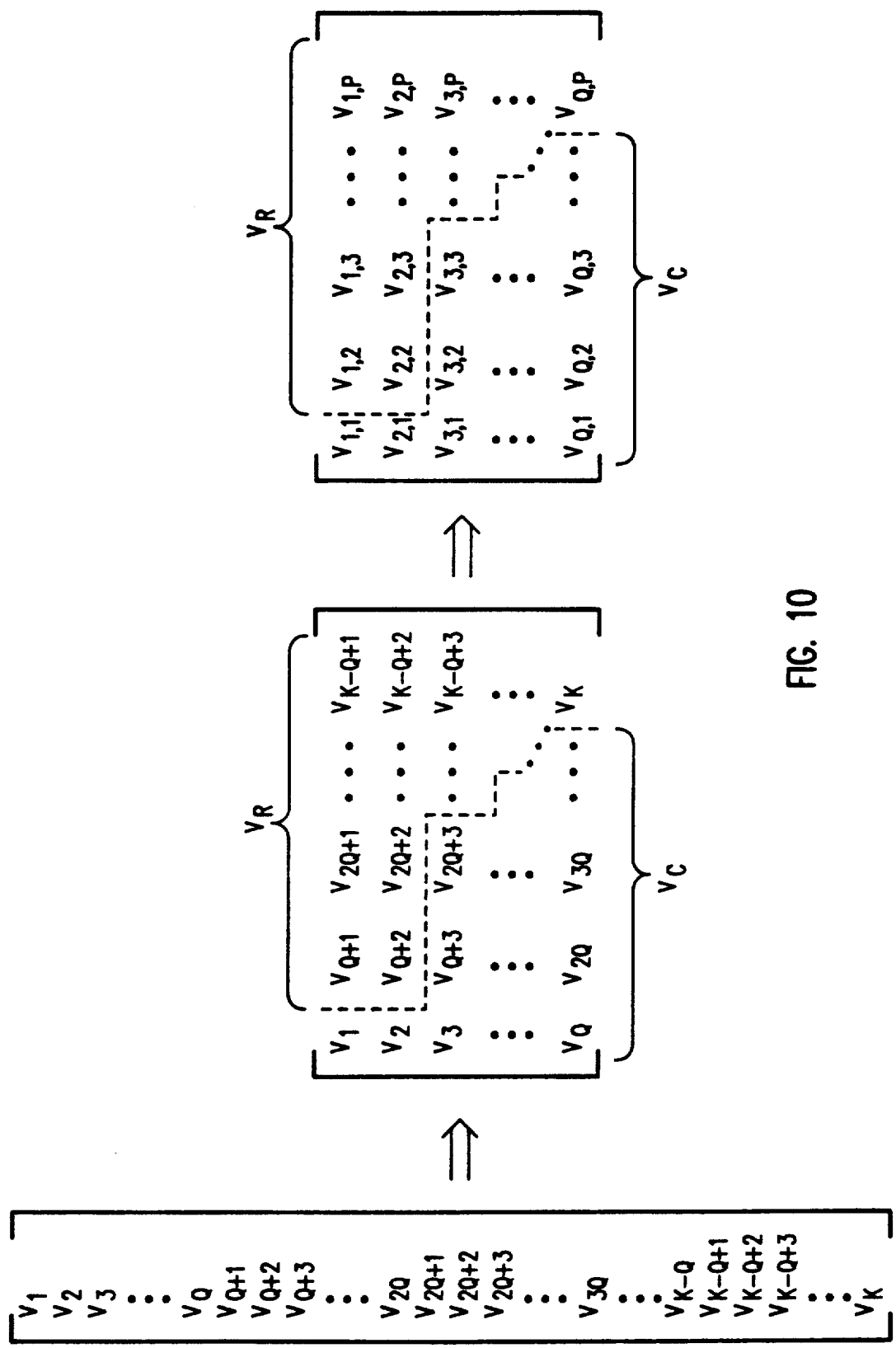
FIG. 10

$$w_C v_C = \begin{bmatrix} w_{1,1;1,1} & w_{1,1;2,1} & w_{1,1;3,1} & \cdots & w_{1,1;Q,1} & w_{1,1;3,2} & w_{1,1;4,2} & \cdots \\ w_{2,1;1,1} & w_{2,1;2,1} & w_{2,1;3,1} & \cdots & w_{2,1;Q,1} & w_{2,1;3,2} & w_{2,1;4,2} & \cdots \\ w_{3,1;1,1} & w_{3,1;2,1} & w_{3,1;3,1} & \cdots & w_{3,1;Q,1} & w_{3,1;3,2} & w_{3,1;4,2} & \cdots \\ \vdots & \vdots & \vdots & & \vdots & \vdots & \vdots \\ w_{P,1;1,1} & w_{P,1;2,1} & w_{P,1;3,1} & \cdots & w_{P,1;Q,1} & w_{P,1;3,2} & w_{P,1;4,2} & \cdots \end{bmatrix} \begin{bmatrix} v_{1,1} \\ v_{2,1} \\ v_{3,1} \\ \vdots \\ v_{Q,1} \\ v_{3,2} \\ v_{4,2} \\ \vdots \end{bmatrix}$$

FIG. 11

$$w_R v_R = \begin{bmatrix} w_{1,1;1,2} & w_{1,1;1,3} & w_{1,1;1,4} & \cdots & w_{1,1;1,Q} & w_{1,1;2,2} & w_{1,1;2,3} & \cdots \\ w_{1,2;1,2} & w_{1,2;1,3} & w_{1,2;1,4} & \cdots & w_{1,2;1,Q} & w_{1,2;2,2} & w_{1,2;2,3} & \cdots \\ w_{1,3;1,2} & w_{1,3;1,3} & w_{1,3;1,4} & \cdots & w_{1,3;1,Q} & w_{1,3;2,2} & w_{1,3;2,3} & \cdots \\ \vdots & \vdots & \vdots & & \vdots & \vdots & \vdots \\ w_{1,P;1,2} & w_{1,P;1,3} & w_{1,P;1,4} & \cdots & w_{1,P;1,Q} & w_{1,P;2,2} & w_{1,P;2,3} & \cdots \end{bmatrix} \begin{bmatrix} v_{1,2} \\ v_{1,3} \\ v_{1,4} \\ \vdots \\ v_{1,P} \\ v_{2,2} \\ v_{2,3} \\ \vdots \end{bmatrix}$$

FIG. 12

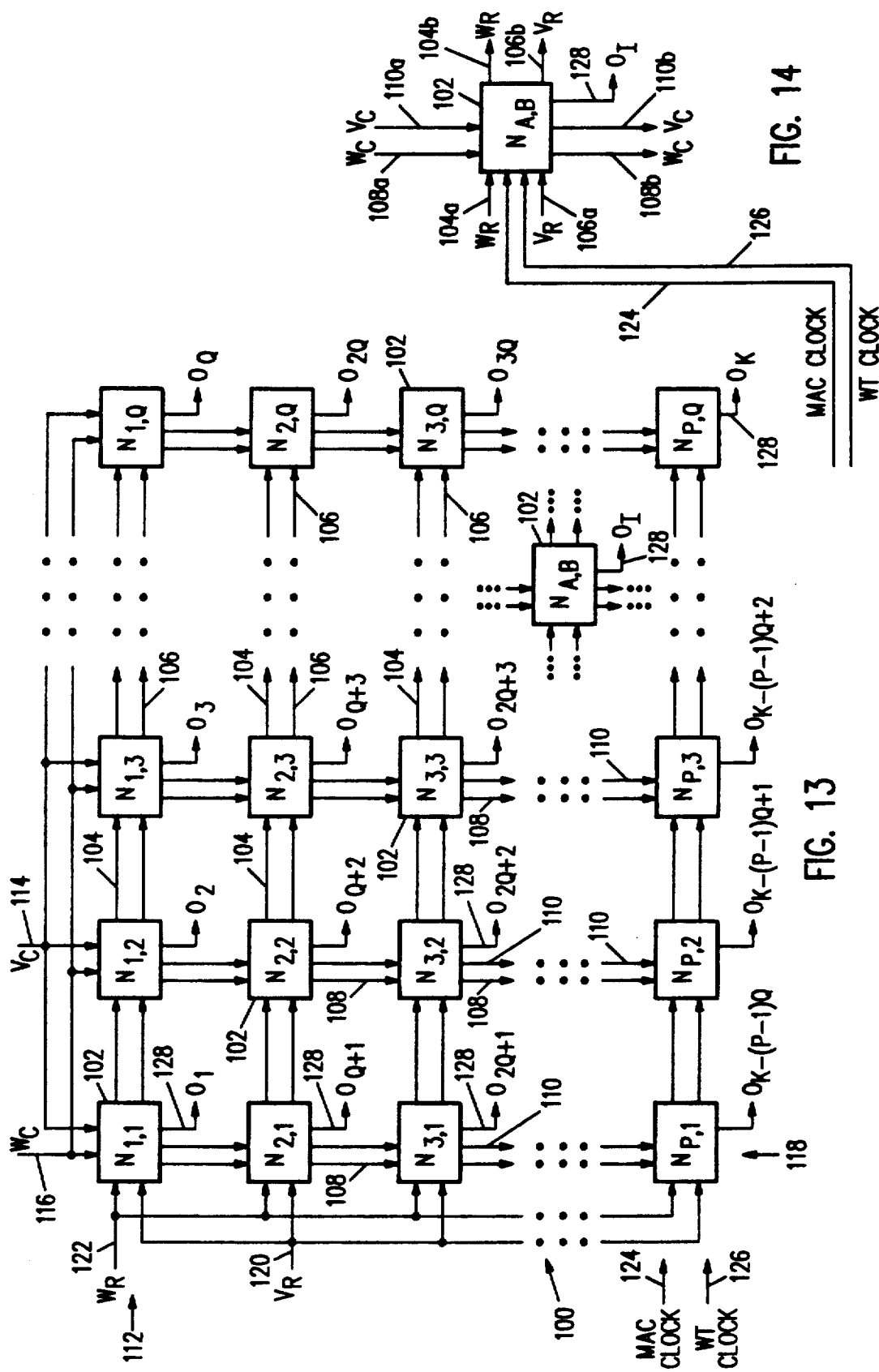
FIG. 13
FIG. 14

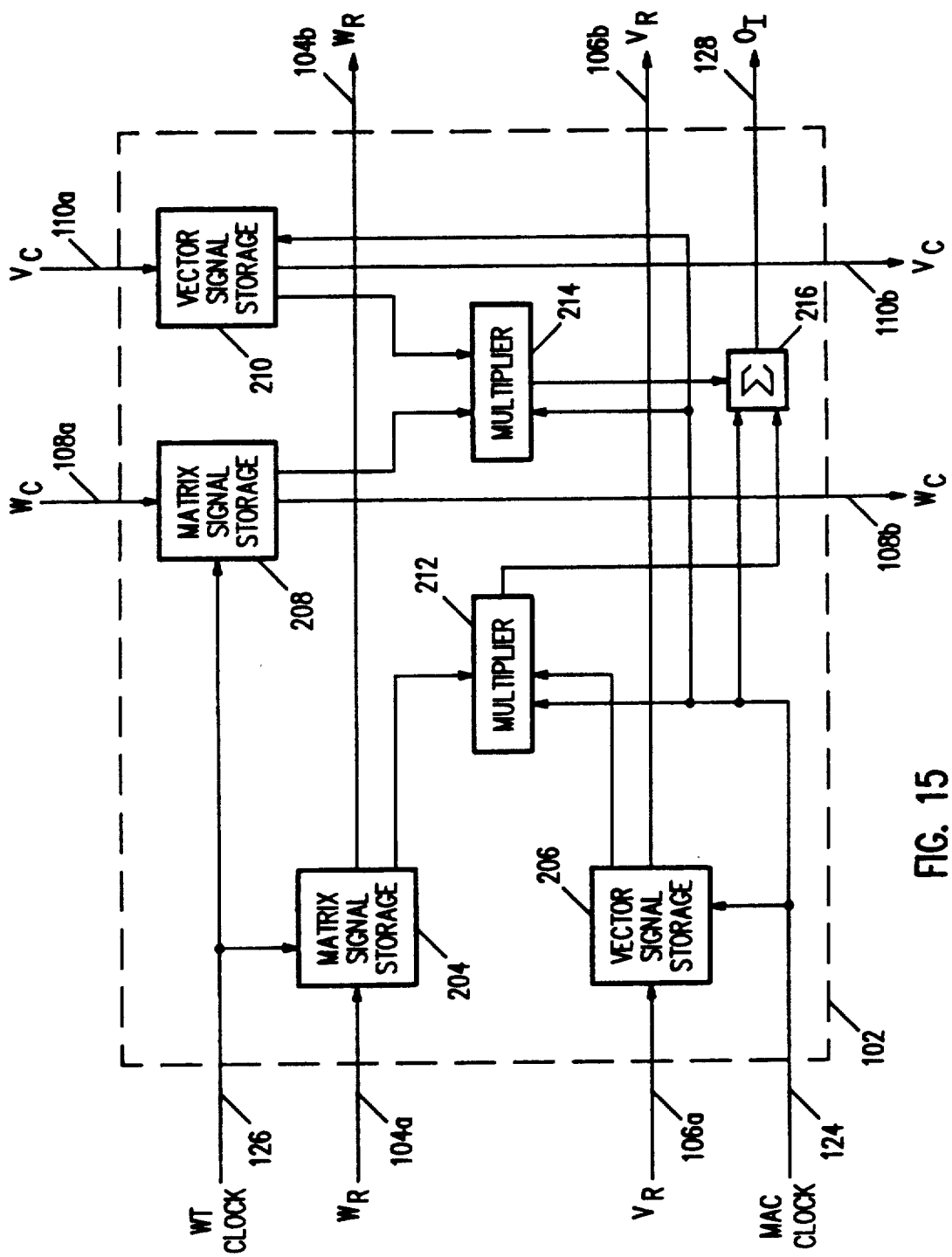
FIG. 15

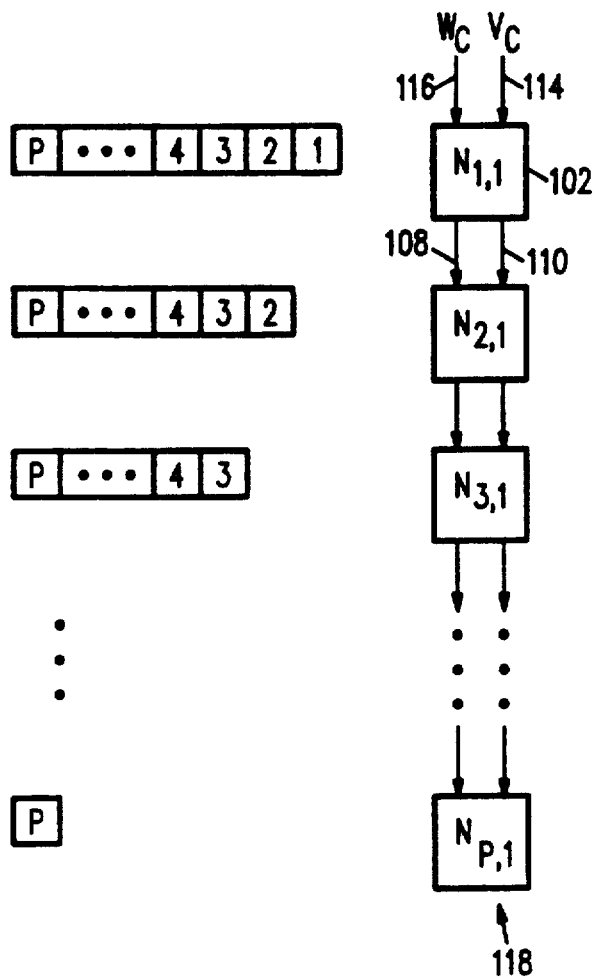
FIG. 16
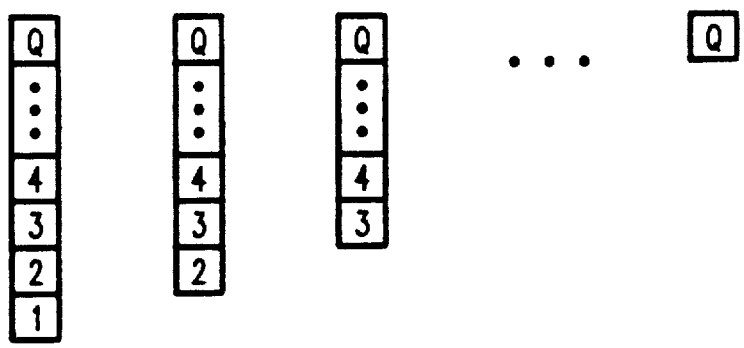
FIG. 17

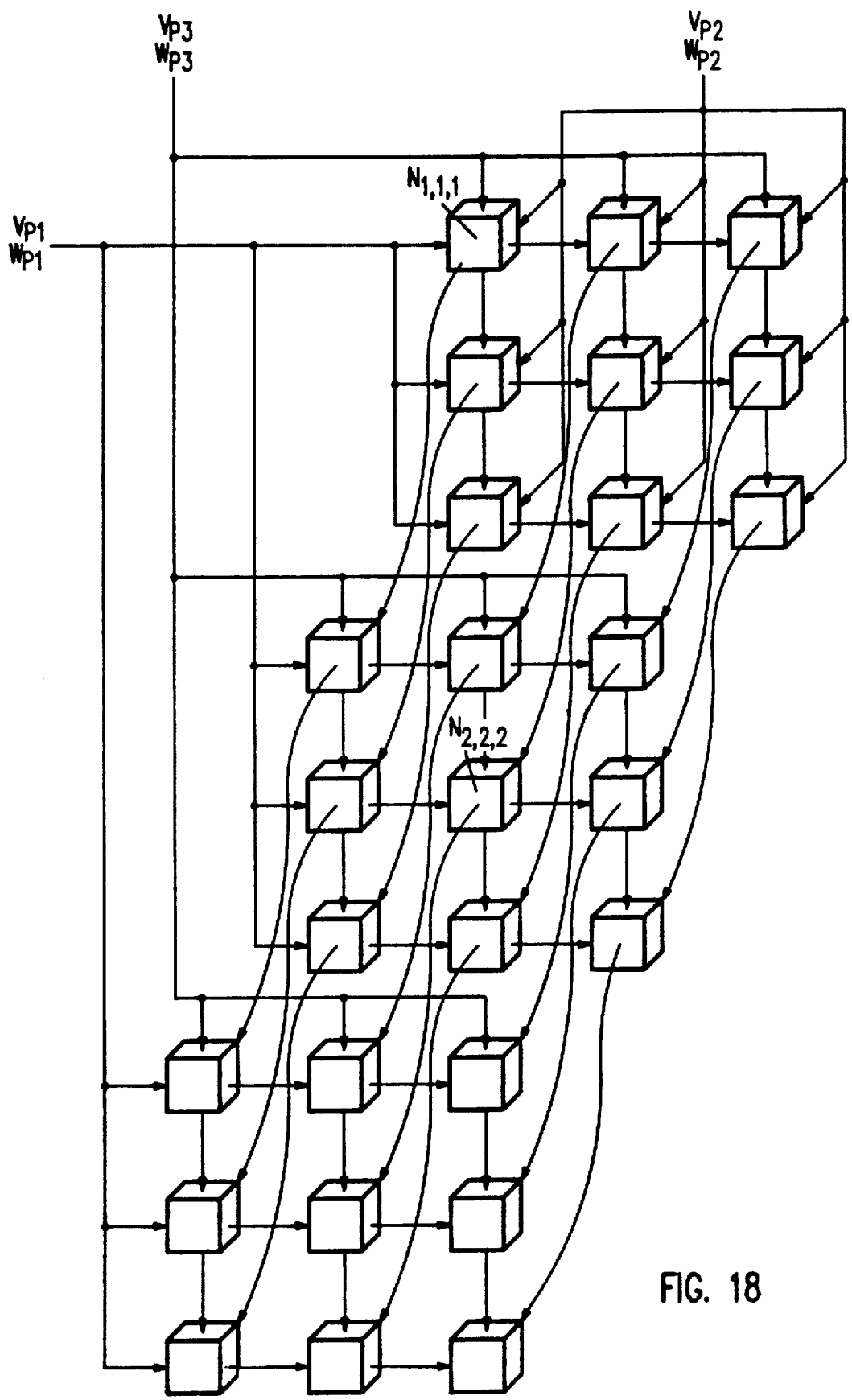
FIG. 18

SYSTOLIC ARRAY FOR MULTIDIMENSIONAL MATRIX COMPUTATIONS

BACKGROUND OF THE INVENTION

1. Field of the invention

The present invention relates to array processors, and in particular, to systolic array processors which process multiple signals in parallel in multiple dimensions.

2. Description of the Related Art

Systolic processors, i.e. processors which systolically "pump," or transfer, data from one processing element to another, are well known in the art. Systolic arrays have been used to increase the pipelined computing capability, and therefore the computing speed, of various types of signal processors.

Systolic array processors are particularly useful for processing, e.g. multiplying, two signal sets, where the first signal set represents a matrix parameter set and the second signal set represents a vector parameter set. In other words, the first signal set represents a matrix parameter set which can be represented as an M-by-K ("M×K") matrix having M rows and K columns of parameters, and the second signal set represents a K×1 vector having K rows and 1 column of parameters.

Referring to FIG. 1, a representation of the matrix-vector multiplication of two such signal sets can be seen. The matrix signal set W has matrix signals $W_{I,J}$ and the vector signal set V has vector signals $V_J$, where I is an element of the set $\{1,2,3, \ldots, M\}$ and J is an element of the set $\{1,2,3, \ldots, K\}$. This can be expressed mathematically by the following formula:

$$O_I = \sum_{J=1}^{K} W_{I,J} V_J$$

Such signal sets are also found in many artificial neural network models, including the Hopfield neural network model. Referring to FIG. 2, a simple artificial neural network with its associated signal sets can be seen. The first layer of neurons $n_{1,J}$, or nodes, receives some form of input signals $I_J$, and based thereon, generates a number of voltage signals $V_J$, which can be represented as a voltage vector V.

Coupling the respective voltage signals $V_J$ to the second layer of neurons $n_{2,I}$ are a number of scaling elements (e.g. "adaptive weights"), which introduce scaling, or "weigh," signals $W_{I,J}$ for scaling or "weighting" the voltage signals $V_J$ prior to their being received by the second layer neurons $n_{2,I}$. It will be understood that, with respect to the subscripted notation for representing the scaling or weighting signals $W_{I,J}$, the first subscripted character "I" represents the destination neuron $n_{2,I}$ in the second layer, and the second subscripted character "J" represents the source neuron $n_{1,J}$ of the voltage signal $V_J$ in the first layer.

The simplest form of systolic processing array used for performing the matrix-vector multiplication of signal sets, as discussed above, is one-dimensional. One type of one-dimensional systolic array is a "ring" systolic array, shown in FIG. 3.

The systolically coupled processing elements $N_J$ are interconnected as shown, with signal flow represented by the arrows. First, the corresponding voltage signals $V_J$ are initially coupled into their corresponding processing elements $N_J$. Then, following the application of each clock pulse (not shown, but common to each processing element $N_J$), the matrix signals $W_{I,J}$ are sequentially inputted to their corresponding processing element $N_J$, as shown. Therein, each matrix signal $W_{I,J}$ is multiplied by its corresponding voltage signal $V_J$ and accumulated, i.e. stored, within the processing element $N_J$.

Following the next clock signal, the foregoing is repeated, with the voltage signals $V_J$ being transferred to subsequent processing elements $N_J$ to be multiplied by the corresponding matrix signal $W_{I,J}$ therein. For example, the voltage signals $V_J$ which are transferred between the processing elements $N_J$ are shown in parentheses. This is repeated K−1 times, i.e. for a total of K times, to produce the final matrix-vector product outputs $O_I$. The "ring" configuration facilitates multiple iterations of the matrix-vector products, a desirable feature used in the learning phase of an artificial neural network. Further discussions of the ring systolic array can be found in "Parallel Architectures for Artificial Neural Nets," by S. Y. Kung and J. N. Hwang, IJCNN 1989, pp. II-165 through II-172.

A second type of one-dimensional systolic array relies on a configuration in accordance with the "STAMS" (Systematic Transformation of Algorithms for Multidimensional Systolic arrays) technique. The STAMS technique is discussed in detail in "Algorithms for High Speed Multidimensional Arithmetic and DSP Systolic Arrays," by N. Ling and M. A. Bayoumi, Proceedings of the 1988 International Conference on Parallel Processing, Vol. I, pp. 367-374. An example of a one-dimensional STAMS systolic array is shown in FIG. 4. dimensional arrays is shorter and more processing is done in parallel. This three-dimensional configuration requires only T+K−1 clock cycles.

Even though the two-dimensional and three-dimensional STAMS systolic array configurations discussed above provide improvements with respect to processing speed, minimal if any improvement is provided with respect to the number and complexity of the local or global interconnections required for inputting the matrix W and vector V signals. Furthermore, even though the one-dimensional ring systolic array already provides reasonable processing speed, its requisite global interconnections are complex and impractical. Moreover, no improvements are provided by any of the foregoing arrays with respect to matrix signal $W_{I,J}$ storage requirements.

Moreover, the two- and three-dimensional STAMS systolic array configurations described above are not truly two- or three-dimensional, respectively. The two-dimensional array, as well as each two-dimensional array plane within the three-dimensional array, have their processing elements $N_{A,B}$ interconnected along one dimension only, e.g. left to right. Therefore, the systolic processing actually occurs in one dimension only. Thus, full multidimensional parallelism or pipelining is not achieved and maximum processing speed, i.e. minimum processing time, cannot be achieved.

It would be desirable to have a true multidimensional systolic array configuration providing true multidimensional pipeline operation to maximize processing speed. It would be further desirable to have such a multidimensional systolic processing array in which minimal global or local interconnects are required for inputting the matrix First, just as in the ring systolic array of FIG. 3, the voltage signals $V_J$ are initially inputted into their respective processing elements $N_J$. Then, the matrix signals $W_{I,J}$ are inputted into the processing elements $N_J$, with each respective processing element $N_J$ receiving one column of the matrix of matrix signals $W_{I,J}$, as shown. The weight-voltage products are summed with the corresponding weight-voltage products from the preceding processing element $N_{J-1}$ and then systolically transferred to the next processing element $N_{J+1}$, and the process continues.

The inputting of the matrix signals $W_{I,J}$ into each successive processing element $N_J$ is delayed by one additional clock pulse per processing element stage to allow for the delays associated with the systolic transferring of the accumulated products. This delay can be accomplished by inputting zeros to a processing element $N_J$ until the systolically transferred accumulated products begin to arrive. However, this delay adversely affects the processing speed. As compared to the ring systolic array of FIG. 3 which requires K clock cycles, the STAMS systolic array requires 2K—1 clock cycles to obtain the product outputs $O_I$ of this matrix-vector multiplication.

A number of problems are associated with using these one-dimensional systolic arrays. One problem involves the inputting of the voltage signals $V_J$. If the voltages $V_J$ are to be loaded simultaneously in parallel, global interconnects are required to accomplish this. If they are to be loaded sequentially in serial, numerous local interconnects are required, as well as K clock cycles.

Another problem involves the inputting of the matrix signals $W_{I,J}$. If the matrix signals $W_{I,J}$ are stored locally within each processing element $N_J$, the processing elements $N_J$ must be large enough to provide sufficient storage, i.e. memory, therefor. On the other hand, if the matrix signals $W_{I,J}$ are not stored locally within each processing element $N_J$, but instead inputted as needed, the global interconnections necessary to do this become complex and impractical. Either many parallel input lines, e.g. a wide signal bus structure, or a large number of clock cycles must be provided.

A third problem involves the amount of time required to perform the matrix-vector multiplication, i.e. 2K—1 clock cycles for the STAMS systolic array. Although the ring systolic array requires only K clock cycles, the problem remains, as discussed immediately above, of providing either sufficient local matrix signal storage or complex global interconnections.

One approach to addressing these problems of interconnects, storage area and processing time involves the use of multidimensional systolic processing arrays. For example, parallelism, i.e. parallel processing, can be introduced by subdividing the matrix signals $W_{I,J}$ and vector signals $V_J$. This can be diagrammatically visualized as seen in FIGS. 5A-5B. This can be expressed mathematically by the following formula:

$$O_I = \sum_{E=0}^{P-1} \sum_{F=0}^{Q-1} W_{I,QE+F+1} V_{QE+F+1}$$

Each row I of the matrix W is divided into P groups of Q signals $W_{I,J}$. In other words, the first of the P groups of Q signals $W_{I,J}$ contains the matrix signals $W_{1,1}$-$W_{1,Q}$. Similarly, the vector V is divided into P groups of Q voltages $V_J$. For example, the first of the P groups of Q voltages $V_J$ includes the voltages $V_1$-$V_Q$. This can be visualized in even simpler form as shown in FIG. 5B.

The processing of these P groups of Q signals $W_{I,J}$, $V_J$ can be accomplished by using several one-dimensional STAMS systolic arrays, such as that shown in FIG. 4, in parallel, as shown in FIG. 6A. The operation of each separate systolic array is in accordance with that described for the one-dimensional STAMS systolic array of FIG. 4 above, with the exception that only Q, rather than K, processing (i.e. clock) cycles are required for each systolic array to complete one subproduct. The subproducts of each array are then summed together to provide the final product outputs $O_I$. Visualizing this systolic array configuration as two-dimensional is perhaps more easily done by referring to FIG. 6B.

This two-dimensional systolic array configuration is an improvement over the one-dimensional STAMS configuration, with respect to processing time. Processing time is reduced since each one-dimensional array, i.e. each pipeline of processors, within the two-dimensional array is shorter and more processing is done in parallel. This configuration requires only K+Q—1 clock cycles to obtain the product outputs $O_I$ of the matrix-vector multiplication.

Further improvement has been achieved by extending the two-dimensional STAMS systolic array of FIG. 6A to a three-dimensional systolic array. This can be done by further subdividing the matrix W and vector V signals into T groups of P groups of Q signals $W_{I,J}$, $V_J$. This can be visualized diagrammatically by referring to FIGS. 7A-7B. This can be expressed mathematically by the following formula:

$$O_I = \sum_{G=0}^{T-1} \sum_{E=0}^{P-1} \sum_{F=0}^{Q-1} W_{I,PQG+QE+F+1} V_{PQG+QE+F+1}$$

As seen in FIG. 7A, each row I of the matrix W and the vector V is divided into T groups, which in turn are divided into P groups of Q signals $W_{I,J}$, $V_J$. For example, the first of the P groups within the first of the T groups contain the matrix signals $W_{1,1}$-$W_{1,Q}$ and the vector signals $V_1$-$V_Q$. FIG. 7B represents a more simplified depiction of this multiple subdivision of the matrix W and vector V signals.

Referring to FIG. 8A, a realization of such a three-dimensional systolic array is illustrated. Two-dimensional systolic arrays, similar to that illustrated in FIG. 6A, are disposed as if on T parallel planes. The operation of each of the T two-dimensional systolic arrays is similar to that as s described above for FIG. 6A. The subproduct outputs of each of the T two-dimensional arrays are summed together to produce the full product outputs $O_I$. The three-dimensional nature of this array can perhaps be better visualized by referring to FIG. 8B.

This three-dimensional STAMS systolic array configuration is an improvement over the two-dimensional configuration inasmuch as fewer processing, i.e. clock, cycles are required to complete each product output $O_I$. Processing time is reduced since each one-dimensional array, i.e. each and vector signals. It would be still further desirable to have such a multidimensional systolic processing array with minimal matrix signal storage requirements for each processing element.

SUMMARY OF THE INVENTION

A multidimensional systolic array processor in accordance with the present invention has an architecture which maximizes processing parallelism and minimizes global interconnections. Further, the present invention minimizes local matrix signal storage requirements within each processing element.

The present invention maximizes processing parallelism by interconnecting its processing elements along multiple dimensions. Therefore, systolic processing occurs along multiple dimensions. For example, a two-dimensional systolic array processor in accordance with the present invention includes a PxQ matrix having P rows and Q columns of processing elements, each of which is systolically coupled row-to-row and column-to-column for full pipeline processing within each row and each column. A three-dimensional systolic array processor has a PxQxT array with T planes of P rows and Q columns of processing elements, each of which is systolically coupled plane-to-plane-to-plane for full pipeline processing.

The present invention minimizes global interconnections of the processing elements. For the two-dimensional case, appropriate matrix and vector signal subsets are inputted to only one row and one column of the two-dimensional processing array. These matrix and vector signal subsets are specifically formed so that they need to be inputted to only one row and one column, and yet still be properly processed systolically along all dimensions within the array.

For the three-dimensional case, appropriate matrix and vector signal subsets are inputted to three perpendicular planes of the three-dimensional processing array. For higher-dimensional cases, appropriate matrix and vector signal subsets are similarly inputted to the higher-dimensional processing arrays.

The present invention minimizes local matrix signal storage requirements by inputting specifically formed matrix signal subsets to only one row and one column of the two-dimensional processing array, and to three perpendicular planes of the three-dimensional processing array. These matrix signal subsets are formed to allow the sizes of the matrix signal subsets to be reduced as they are systolically transferred to subsequent processing elements along each dimension within the array. As the matrix signal subsets decrease in size through the array, the local storage, e.g. memory, needed for temporarily storing each matrix signal subset within each processing element is successively reduced. Processing speed is not sacrificed since the matrix signal subsets are transferred to the subsequent processing element at a clock rate higher than that used for systolically transferring the vector signal subsets.

These and other objectives, features and advantages of the present invention will be understood upon consideration of the following detailed description of the invention and the accompanying drawings.

BRIEF DESCRIPTION OF THE DRAWINGS

FIG. 1 illustrates diagrammatically a conventional matrix-vector multiplication.

FIG. 2 illustrate a simple conventional two-layer artificial neural network.

FIG. 3 illustrates a conventional one-dimensional "ring" systolic array.

FIG. 4 illustrates an alternative conventional one-dimensional systolic array.

FIGS. 5A-5B illustrate diagrammatically a conventional matrix-vector multiplication, wherein the matrix and vector are subdivided into matrix and FIGS. 6A-6B illustrate a conventional quasi two-dimensional systolic array.

FIGS. 7A-7B illustrate diagrammatically a conventional matrix-vector multiplication, wherein the matrix and vector of FIGS. 5A-5B are further subdivided into matrix and vector subsets, respectively.

FIGS. 8A-8B illustrate a conventional quasi three-dimensional systolic array.

FIG. 9 illustrates the Layer 1 and 2 neurons of FIG. 2 reconfigured as two-dimensional neural arrays in accordance with the present invention.

FIG. 10 illustrates diagrammatically the reconfiguration of the one-dimensional vector signal set of FIG. 1 into a two-dimensional vector signal set in accordance with the present invention.

FIG. 11 illustrates diagrammatically the matrix-vector multiplication of the matrix and vector column signal subsets in accordance with the present invention.

FIG. 12 illustrates diagrammatically the matrix-vector multiplication of the matrix and vector row signal subsets in accordance with the present invention.

FIG. 13 illustrates a block diagram of a two-dimensional systolic array processor in accordance with the present invention.

FIG. 14 illustrates a single processing element of the two-dimensional processor of FIG. 13.

FIG. 15 illustrates a functional block diagram of a single processing element of the two-dimensional processor of FIG. 13.

FIG. 16 illustrates the reduced local matrix signal storage requirements of the two-dimensional processor of FIG. 13.

FIG. 17 further illustrates the reduced local matrix signal storage requirements of the two-dimensional processor of FIG. 13.

FIG. 18 illustrates a block diagram of a three-dimensional systolic array processor in accordance with the present invention.

DETAILED DESCRIPTION OF THE INVENTION

Referring to FIG. 9, the Layer 1 and 2 neurons $n_1$, $n_2$ of an artificial neural network (as shown in FIG. 1) are reconfigured into two-dimensional neural arrays. The original input signals $I_J$ now have double subscripted notation to reflect the two-dimensional set of input signals $I_{Y,Z}$. Similarly, the original voltage signals $V_J$ now have double subscripted notation to reflect the two-dimensionality of the set of voltage signals $V_{Y,Z}$. Indicated in brackets for some of the Layer 1 neurons in FIG. 9 are the original Layer 1 neuron and voltage identifiers (the remaining identifiers being left out for clarity).

The Layer 2 neurons also now have double subscripted notation to reflect the new two-dimensionality of the set of Layer 2 neurons $n_{A,B}$. Indicated in brackets for some of the Layer 2 neurons are the original Layer 2 neuron identifiers (the remaining identifiers being left out for clarity).

The original matrix, e.g. "weight," signals $W_{I,J}$ now have quadruple subscripted notation to reflect their new multidimensionality, i.e. $W_{A,B;Y,Z}$. The first subscripted pair of characters "A,B" represents the destination neuron $n_{A,B}$ in the second layer. The second subscripted pair of characters "Y,Z" represents the source of the voltage signal $V_{Y,Z}$ in the first layer. Indicated in brackets for some of the matrix signals $W_{A,B;Y,Z}$ are the original matrix signal identifiers $W_{I,J}$ (the remaining identifiers being left out for clarity).

It should be understood that the representations of the Layer 1 and 2 neurons, along with their subscripted notations, were selected arbitrarily. They can be reconfigured as desired, provided that the resulting subscripted notation for the matrix signals be consistent therewith.

It should be further understood that it has been assumed for the sake of simplicity that M=K for the reconfigured array of Layer 2 neurons as represented in FIG. 9. However, this is not necessary to the present invention. Ideally, the numbers of rows and columns should be equal, i.e. P=Q. This is to maximize the improvements in processing speed and to minimize the local matrix signal storage requirements in accordance with the present invention. However, if K cannot be expressed as a square, i.e. if P≠Q, then the numbers of neurons in both Layers 1 and 2 can be approximated to the nearest square. Extra processing cycles would be required because of such an approximation, but significant improvements in processing speed and local matrix signal storage requirements would still be realized.

Referring to FIG. 10, the reconfiguration of the one-dimensional vector signal set $V_J$ of FIG. 1 into a two-dimensional vector signal set $V_{Y,Z}$ can be understood. The one-dimensional vector signal set $V_J$ is initially mapped into a two-dimensional vector signal set with the original subscripted notation left intact. This two-dimensional vector signal set is then given new double subscripted notation to reflect the two-dimensionality of the reconfigured vector signal set $V_{Y,Z}$.

Also indicated in FIG. 10 (with dashed lines within the two-dimensional vector signal sets) are two vector signal subsets. One is referred to as the vector column signal subset $V_C$ and the other is referred to as the vector row signal subset $V_R$. These vector signal subsets $V_C$, $V_R$ are multiplied by the matrix signals $W_{A,B;Y,Z}$ as represented in FIG. 9. The matrix signals $W_{A,B;Y,Z}$ are separated into corresponding matrix column $W_C$ and row $W_R$ signal subsets. The vector column $V_C$ and row $V_R$ signal subsets are multiplied by the matrix column $W_C$ and row $W_R$ signal subsets, respectively, as shown in FIGS. 11 and 12. Therefore, the matrix-vector products $O_J$ are identified according to the following formulas:

$$O_J = O_C + O_R$$

where:

$$O_C = \sum_{Z=1}^{Q} \sum_{Y=X}^{P} W_{A,B;Y,Z} V_J$$

$$J = Y - Z - P + \sum_{Z=1}^{Z} (P - Z + 2)$$

$X = Z$, for odd $Z$
$\quad = Z + 1$, for even $Z$ and $$O_R = \sum_{Y=1}^{P} \sum_{Z=X}^{Q} W_{A,B;Y,Z} V_J$$

$$J = Z - Y - Q + \sum_{Y=1}^{Y} (Q - Y + 2)$$

$X = Y$, for even $Y$
$\quad = Y + 1$, for odd $Y$.

Based upon the foregoing, the vector $V_C$, $V_R$ and matrix $W_C$, $W_R$ signal subsets can be identified according to the following formulas:

where:

$$J = Y - Z - P + \sum_{Z=1}^{Z} (P - Z + 2)$$

$Z = 1, 2, 3, \ldots, Q$ $Y = X, X+1, X+2, \ldots, P$ $X = Z$, for odd $Z$
$\quad = Z + 1$, for even $Z$;

and $V_R = V_{Y,Z} = V_J$ $W_R = W_{A,B;Y,Z}$ where:

$$J = Z - Y - Q + \sum_{Y=1}^{Y} (Q - Y + 2)$$

$Y = 1, 2, 3, \ldots, P$ $Z = X, X+1, X+2, \ldots, Q$ $X = Y$, for even $Y$
$\quad = Y + 1$, for odd $Y$.

Referring to FIG. 13, a two-dimensional systolic processing array 100 in accordance with the present invention includes K processing elements 102, designated by $N_{A,B}$ where A is an element of the set {1,2,3, ...,P}, B is an element of the set {1,2,3, ...,Q} and K=PQ. The processing elements 102 are interconnected in a two-dimensional matrix 100 having P rows and Q columns.

The processing elements 102 are mutually coupled column-to-column via matrix row subset signal lines 104 and vector row subset signal lines 106. These signal lines 104, 106 provide the means by which the matrix $W_R$ and vector $V_R$ row signal subsets are systolically transferred column-to-column among the processing elements 102. The processing elements 102 are further mutually coupled row-to-row via matrix column subset signal lines 108 and vector column subset signal lines 110. It is by these signal lines 108, 110 that the matrix $W_C$ and vector $V_C$ signal subsets are systolically transferred row-to-row among the processing elements 102.

All processing elements 102 in the first row 112 receive a vector signal input 114 which is a vector column signal subset $V_C$ of the vector signal set V. All processing elements 102 in the first row 112 further receive a matrix signal input 116 which is a matrix column signal subset $W_C$ of the matrix signal set W.

All processing elements 102 in the first column 118 receive a vector signal input 120 which is a vector row signal subset $V_R$ of the vector signal set V. All processing elements 102 in the first column 118 further receive a matrix signal input 122 which is a matrix row signal subset $W_R$ of the matrix signal set W.

All processing elements 102 within the matrix 100 further receive two clock signals. The first clock signal, a multiply-accumulate ("MAC") clock 124, initiates and provides the timing for the multiply-accumulate operation (discussed more fully below) within each processing element 102. The second clock signal, a weight transfer ("WT") clock 126, initiates and provides the timing for the transfer of the matrix, e.g. weight, signals $W_{I,J}$ among the processing elements 102 (discussed more fully below).

The vector column signal subset $V_C$ is inputted in parallel to all processing elements 102 within the first row 112, one signal at a time in accordance with the MAC clock 124. As each signal of this signal subset $V_C$ is inputted, the corresponding signals in the matrix column signal subset $W_C$ (according to the formula given above) are also inputted to the processing elements 102 within the first row 112. The number of signals from the matrix column signal subset $W_C$ which are inputted with each signal of the vector column signal subset $V_C$ is P, one for each of the processing elements 102 in each column (discussed more fully below).

Similarly, the vector row signal subset $V_R$ is inputted in parallel to all processing elements 102 in the first column 118, one signal at a time in accordance with the MAC clock 124. Inputted in parallel therewith are the corresponding signals from the matrix row signal subset $W_R$ (according to the formula given above). The number of these corresponding signals within the matrix row signal subset $W_R$ is Q, one for each processing element 102 within each row (discussed more fully below).

As discussed further below, the matrix $W_C$ and vector $V_C$ column signal subsets and matrix $W_R$ and vector $V_R$ row signal subsets are multiplied simultaneously and then added in each processing element 102. After completing the matrix-vector subproducts and accumulation thereof for the first column and row signals of the column $W_C$, $V_C$ and row $W_R$, $V_R$ signal subsets, this process is repeated for the second column and row signals. However, as discussed further below, the matrix column $W_C$ and row $W_R$ signal subsets each contain fewer signals following each multiplication and accumulation.

The number of signals to be transferred within each matrix column $W_C$ or row $W_R$ signal subset is greater than the corresponding signal in the vector column $V_R$ or row $V_R$ signal subset, respectively. Therefore, the row-to-row or column-to-column transferring of the matrix column $W_C$ and row $W_R$ signal subsets should be done at a higher rate than the corresponding transfer of the vector column $V_C$ and row $V_R$ signal subsets, respectively. Thus, the WT clock 126 operates at a higher frequency than the MAC clock 124.

The rate of the WT clock 126 is the greater of either P- or Q- times that of the MAC clock 124. It will be understood that this provides for transferring all corresponding matrix signals $W_C$, $W_R$ (P signals from the matrix column signal subset $W_C$, and Q signals from the matrix row signal subset $W_R$) "simultaneously" with their corresponding vector signal subsets $V_C$, $V_R$. Processing speed is not sacrificed for this, since the multiply-accumulate operation performed on each vector signal subset $V_C$, $V_R$ requires more time than the mere transfer of one matrix signal $W_{I,J}$ to the next processing element 102.

Referring to FIG. 14, a single processing element $N_{A,B}$ representative of all processing elements 102 within the matrix 100 is illustrated. As discussed above, input signals 104a, 106a, 108a, 110a include the matrix $W_R$ and vector $V_C$ row signal subsets, and matrix $W_C$ and vector $V_C$ column signal subsets which are systolically transferred from prior processing elements 102 in the preceding column and row, respectively. Further input signals, as discussed above, include the MAC clock 124 and WT clock 126.

Output signals 104b, 106b, 108b, 110b include the matrix $W_R$ and vector $V_R$ row signal subsets, and the matrix $W_C$ and vector $V_C$ column signal subsets which are systolically transferred to subsequent processing elements 102 in the next column and row, respectively. As discussed more fully below, the output matrix $W_R$, $W_C$ signal subsets 104b, 108b contain fewer members, i.e. signals, than their corresponding input matrix $W_R$, $W_C$ signal subsets 104a, 108a. Another output signal 12B is the matrix-vector subproduct signal $O_I$.

The two-dimensional operation of the systolic processing array 100 in accordance with the present invention, as shown in FIG. 9, is substantially faster. It can be shown that the total processing, e.g. computation, time is $P(P+1)/2 - (P/2) + P$ cycles (i.e. of MAC clock 124). This is substantially faster than the quasi two-dimensional array of FIG. 6A discussed above. Mathematically, the improvement in processing speed can be expressed by the following formula:

$$\frac{[P(P+1)/2 - (P/2) + P]}{Q + K - 1}$$

For example, if P=Q=10 (and therefore K=100), the quasi two-dimensional array of FIG. 6A requires $Q+K-1=10+100-1=109$ cycles. The array 100 of the present invention, however, only requires $10(10+1)/2-(10/2)+10=60$ cycles. As the array 100 size increases, i.e. as P and Q become greater, the improvement in processing speed of the present invention is enhanced further. It can be shown that this improvement becomes enhanced by as much as 50% over that of the quasi two-dimensional array of FIG. 6A.

Referring to FIG. 15, the operation, e.g. multiply-accumulate (MAC) function, of each processing element 102 can be understood. The matrix $W_R$, $W_C$ signal subsets are inputted and stored in matrix storage elements 204, 208 (e.g. memory circuits or registers). The corresponding vector $V_R$, $V_C$ signal subsets are inputted and selectively stored in vector signal storage elements 206, 210 (e.g. memory circuits or registers). The corresponding matrix $W_C$ and vector $V_C$ column signals are then multiplied, as are the corresponding matrix $W_R$ and vector $V_R$ row signals in multipliers 212, 214. It should be understood that the vector $V_R$, $V_C$ signal subsets need not necessarily be stored, but instead can be inputted directly into their respective multipliers 212, 214.

The resulting matrix-vector subproducts are then summed together in an adder 216. It will be recognized that this multiplication and summation can be done with digital multipliers and adders, or alternatively, a microprocessor can be programmed to perform this. The remaining matrix $W_R$, $W_C$ and vector $V_R$, $V_C$ signal subsets are then systolically transferred to subsequent processing elements 102.

Referring to FIG. 16, the systolic transferring and local storage of successively smaller groups of signals from the matrix column signal subset $W_C$ can be understood. As discussed above, the matrix column signal subset $W_C$ initially has P members, i.e. signals, for each corresponding signal from the vector column signal subset $V_C$. These corresponding matrix $W_C$ and vector $V_C$ signal subsets are then transferred to the second processing element $N_{2,1}$ in the first column 118 via the matrix 108 and vector 110 column subset signal lines.

However, as discussed above for FIG. 11, the first of the signals within the matrix column signal subset $W_C$ corresponding to the inputted signal from the vector column signal subset $V_C$ has already been processed and is no longer needed. Therefore it need not be transferred, i.e. only $P-1$ signals of the matrix column signal subset $W_C$ need to be transferred to the second processing element $N_{2,1}$. Therefore, whereas the storage registers, e.g. memory, within the first processing element $N_{1,1}$ must be large enough to store P matrix signals, the corresponding registers within the second processing element $N_{2,1}$ need only be large enough to store $P-1$ matrix signals.

Similarly, the third processing element $N_{3,1}$ need only store $P-2$ matrix signals, and so on. This continues until the last processing element $N_{P,1}$ which need only contain enough storage area to store one matrix signal. Thus, it can be seen that local storage requirements for the matrix column signal subsets $W_C$ for all processing elements 102 within the first column 118 total $P(P+1)/2$ storage registers. Since each of the Q columns of processing elements 102 are identical, total storage requirements for the full array 100 for the matrix column signal subsets $W_C$ are $QP(P+1)/2$ storage registers.

Referring to FIG. 17, the reduced local storage requirements for the matrix row signal subsets $W_R$ can similarly be understood. As discussed above, corresponding signals from the vector $V_R$ and matrix $W_R$ row signal subsets are inputted into each processing element 102 in the first row 112 of the array 100. As the vector row signal subset $V_R$ is systolically processed and transferred column-to-column through the array 100, its corresponding matrix row signal subset $W_R$ is transferred therewith.

However, as discussed above, the number of corresponding signals within the transferred matrix row signal subset $W_R$ is reduced by one signal with each systolic processing cycle and transfer. For example, the first processing element $N_{1,1}$ in the first row 112 of processing elements 102 receives a signal from the vector row signal subset $V_R$, and a corresponding group of signals from the corresponding matrix row signal subset $W_R$, which has Q members, i.e. signals. After processing by the first processing element $N_{1,1}$, the first matrix signal within the matrix row signal subset $W_R$ is no longer needed, and therefore need not be transferred to the second processing element $N_{1,2}$. Thus, only $Q-1$ signals of the matrix row signal subset $W_R$ are transferred and stored within the second processing element $N_{1,2}$.

This continues to be true as the vector $V_R$ and matrix $W_R$ row signal subsets are systolically processed and transferred column-to-column through the array 100. Thus, the last processing element $N_{1,Q}$ need provide local storage registers for only one signal from the matrix row signal subset $W_R$.

Based upon the foregoing, it can be shown that the total local storage requirements for all processing elements 102 within each row are $Q(Q+1)/2$ storage registers. Including all P rows of processing elements 102, the total local storage requirements for storing the matrix row signal subsets $W_R$ are $PQ(Q+1)/2$ storage registers.

Therefore, it can be shown that for the case of $P=Q$ and $K=PQ$, the total local storage requirements for both the matrix column $W_C$ and row $W_R$ signal subsets are $P^2(P+1)$ storage registers. This represents a significant improvement over the local storage requirements of the quasi two-dimensional array of FIG. 6A. For example, for the case of $P=Q$ and $K=PQ$, local matrix signal storage requirements are reduced approximately by a factor of P, or more precisely, according to the following formula:

$$\frac{PQ(P+1)}{(PQ)(PQ)} = P^2(P+1)/P^4 = (P+1)/P^2$$

It should be understood that the foregoing principles of a two-dimensional systolic array in accordance with the present invention can also be extended to a three-dimensional systolic array. In such a three-dimensional systolic array, all adjacent processing elements along all three dimensions are mutually coupled for systolically processing and transferring the matrix and vector signal subsets. Whereas the quasi three-dimensional systolic array of FIG. 8A requires $T+K-1$ processing cycles to produce the product outputs $O_I$, a fully three-dimensional systolic array in accordance with the present invention requires only approximately $P(P+1)(2P+1)/12$ processing cycles (for $P=Q=T$).

Referring to FIG. 18, a block diagram of a three-dimensional systolic processing array in accordance with the present invention for $P=Q=T=3$ is illustrated. Pipelining is done in all three dimensions simultaneously as shown. The matrix $W_{P1}$, $W_{P2}$, $W_{P3}$ and vector $V_{P1}$, $V_{P2}$, $V_{P3}$ signal subsets are inputted to three perpendicular planes of processing elements. As in the two-dimensional case discussed above, the corresponding matrix and vector signals are inputted into their respective processing elements sequentially, multiplied and accumulated therein. The remaining corresponding matrix and vector signals are then systolically transferred to subsequent processing elements plane-by-plane-by-plane throughout the three-dimensional processing array.

It will be recognized that the "cube" to which the corresponding matrix and vector signals are transferred becomes smaller by one processing element on all sides. For example, starting at a corner processing element $N_{1,1,1}$, the matrix $W_{P1}$, $W_{P2}$, $W_{P3}$ and vector $V_{P1}$, $V_{P2}$, $V_{P3}$ signal subsets are initially inputted to three perpendicular planes of processing elements. The matrix and vector signals are then systolically transferred to subsequent processing elements plane-by-plane-by-plane throughout the three-dimensional processing array, with a new "corner" processing element $N_{2,2,2}$ located one processing element in from the initial corner processing element $N_{1,1,1}$.

Hence, it can be seen from the foregoing that a multidimensional systolic array processor in accordance with the present invention provides improved processing speed due to the full multidimensionality of its processing element interconnections, improved global interconnectivity (e.g. by requiring external connections to only one row and one column of the two-dimensional array), and reduced local storage requirements by avoiding the unnecessary transferring and local storage of unneeded matrix signals.

It should be understood that various alternatives to the embodiments of the present invention described herein can be employed in practicing the present invention. It is intended that the following claims define the scope of the present invention, and that structures and methods within the scope of these claims and their equivalents be covered thereby.

What is claimed is:

1. A multidimensional systolic array processor comprising:

a signal processing array systolically coupled in a PxQ matrix having P rows and Q columns of processing means $N_{A,B}$, where $A \epsilon \{1,2,3, \ldots ,P\}$ and $B \epsilon \{1,2,3, \ldots ,Q\}$, to systolically process a matrix signal set W having a plurality of matrix signals $W_{I,J}$ and a vector signal set V having a plurality of vector signals $V_J$, where $I \epsilon \{1,2,3, \ldots M\}$ and $J \epsilon \{1,2,3, \ldots ,K\}$, said matrix signal set W representing a matrix parameter set selectively represented as an MxK matrix having M rows and K columns f parameters, and said vector signal set V representing a vector element vector having K parameters, wherein each processing means $N_{1,B}$ in a first one of said rows of processing means $N_{A,B}$ is coupled to receive a vector column signal subset $V_C$ of said vector signal set V, wherein said vector column signal subset $V_C$ includes a first subplurality of said plurality of vector signals $V_J$ and where $$V_C = V_{Y,Z} = V_J$$

where:

$$J = Y - Z - P + \sum_{Z=1}^{Z} (P - Z + 2)$$

$Z = 1, 2, 3, \ldots, Q$
$Y = X, X + 1, X + 2, \ldots, P$
$X = Z,$ for odd $Z$
$\phantom{X} = Z + 1,$ for even $Z$.

2. An array processor as recited in claim 1, wherein each processing means $N_{A,1}$ in a first one of said columns of processing means $N_{A,B}$ is coupled to receive a vector row signal subset $V_R$ of said vector signal set V, wherein said vector row signal subset $V_R$ includes a second subplurality of said plurality of vector signals $V_J$ and where $$V_R = V_{Y,Z} = V_J$$

where:

$$J = Z - Y - Q + \sum_{Y=1}^{Y} (Q - Y + 2)$$

$Y = 1, 2, 3, \ldots, P$ $Z = X, X + 1, X + 2, \ldots, Q$ $X = Y,$ for even $Y$
$\phantom{X} = Y + 1,$ for odd $Y$.

3. An array processor as recited in claim 1, wherein said systolic coupling of said processing means $N_{A,B}$ comprises individually coupling each processing means $N_{A,B}$ in each row with a corresponding processing means $N_{A-1,B}$ in a preceding row via a vector column subset signal line $L_{VC(A-1)}$ and a matrix column subset signal line $L_{WC(A-1)}$, and individually coupling each processing means $N_{A,B}$ in each row with a corresponding processing means $N_{A+1,B}$ in a subsequent row via a vector column subset signal line $L_{VC(A+1)}$ and a matrix column subset signal line $L_{WC(A+1)}$.

4. An array processor as recited in claim 2, wherein said systolic coupling of said processing means $N_{A,B}$ comprises individually coupling each processing means $N_{A,B}$ in each column with a corresponding processing means $N_{A,B-1}$ in a preceding column via a vector row subset signal line $L_{VR(B-1)}$ and a matrix row subset signal line $L_{WR(B-1)}$, and individually coupling each processing means $N_{A,B}$ in each column with a corresponding processing means $N_{A,B+1}$ in a subsequent column via a vector row subset signal line $L_{VR(B+1)}$ and a matrix row subset signal line $L_{WR(B+1)}$.

5. An array processor as recited in claim 1, wherein each one of said processing means $N_{1,B}$ in said first row of processing means $N_{A,B}$ is coupled to receive said vector column signal subset $V_C$ substantially simultaneously.

6. An array processor as recited in claim 2, wherein each one of said processing means $N_{A,1}$ in said first column of processing means $N_{A,B}$ is coupled to receive said vector row signal subset $V_R$ substantially simultaneously.

7. An array processor as recited in claim 1, wherein each one of said processing means $N_{A,B}$ comprises a multiplier-accumulator.

8. An array processor as recited in claim 7, wherein said multiplier-accumulator comprises a digital adder and a digital register.

9. An array processor as recited in claim 1, wherein each one of said processing means $N_{A,B}$ comprises a plurality of digital registers.

10. A multidimensional systolic array processor comprising:

a signal processing array systolically coupled in a PxQ matrix having P rows and Q columns of processing means $N_{A,B}$, where $A \epsilon \{1,2,3, \ldots ,P\}$ and $B \epsilon \{1,2,3, \ldots ,Q\}$, to systolically process a matrix signal set W having a plurality of matrix signals $W_{I,J}$ and a vector signal set V having a plurality of vector signals $V_J$, where $I \epsilon \{1,2,3, \ldots ,M\}$ and $J \epsilon \{1,2,3, \ldots K\}$, said matrix signal set W representing a matrix parameter set selectively represented as an MxK matrix having M rows and K columns of parameters, and said vector signal set V representing a vector parameter set selectively represented as a K-element vector having K parameters, wherein each processing means $N_{1,B}$ in a first one of said rows of processing means $N_{A,B}$ is coupled to receive a matrix column signal subset $W_C$ of said matrix signal set W, wherein said matrix column signal subset $W_C$ includes a first subplurality of said plurality of matrix signals $W_{I,J}$ and where $$W_C = W_{A,B,Y,Z}$$

where:

$$\left[ J = Y - Z - P + \sum_{Z=1}^{Z} (P - Z + 2) \right]$$

$Z = 1, 2, 3, \ldots, Q$
$Y = X, X + 1, X + 2, \ldots, P$
$X = Z,$ for odd $Z$
$\phantom{X} = Z + 1,$ for even $Z$.

and further wherein said matrix column signal subset $W_C$ is systolically coupled row-to-row within said matrix of processing means $N_{A,B}$, said coupled matrix column signal subset $W_C$ having a second subplurality of said matrix signals $W_{I,J}$ as said matrix column signal subset $W_C$ is coupled from one of said rows of processing means $N_{A,B}$ to a subsequent row of processing means $N_{A+1,B}$, and still further wherein said second subplurality of matrix signals $W_{I,J}$ is smaller than said first subplurality of matrix signals $W_{I,J}$.

11. An array processor as recited in claim 10, wherein each processing means $N_{A,B}$ is coupled to receive a matrix row signal subset $W_R$ of said matrix signal set W, wherein said matrix row signal subset $W_R$ includes a third subplurality of said plurality of matrix signals $W_{I,J}$ and where $$W_R = W_{A,B,Y,Z}$$

where:

$$\left[ J = Z - Y - Q + \sum_{Y=1}^{Y} (Q - Y + 2) \right]$$

$Y = 1, 2, 3, \ldots, P$ $Z = X, X+1, X+2, \ldots, Q$ $X = Y$, for even $Y$
$\phantom{X} = Y + 1$, for odd $Y$, and further wherein said matrix row signal subset $W_R$ is systolically coupled column-to-column within said matrix of processing means $N_{A,B}$, said coupled matrix row signal subset $W_R$ having a fourth subplurality of said matrix signals $W_{I,J}$ as said matrix row signal subset $W_R$ is coupled from one of said columns of processing means $N_{A,B}$ to a subsequent column of processing means $N_{A,B+1}$, and still further wherein said fourth subplurality of matrix signals $W_{I,J}$ is smaller than said third subplurality of matrix signals $W_{I,J}$.

12. An array processor as recited in claim 10, wherein said systolic coupling of said processing means $N_{A,B}$ comprises individually coupling each processing means $N_{A,B}$ in each row with a corresponding processing means $N_{A-1,B}$ in a preceding row via a vector column subset signal line $L_{VC(A-1)}$ and a matrix column subset signal line $L_{WC(A-1)}$, and individually coupling each processing means $N_{A,B}$ in each row with a corresponding processing means $N_{A+1,B}$ in a subsequent row via a vector column subset signal line $V_{C(A+1)}$ and a matrix column subset signal line $L_{WC(A+1)}$.

13. An array processor as recited in claim 11, wherein said systolic coupling of said processing means $N_{A,B}$ comprises individually coupling each processing means $N_{A,B}$ in each column with a corresponding processing means $N_{A,B-1}$ in a preceding column via a vector row subset signal line $L_{VR(B-1)}$ and a matrix row subset signal line $L_{WR(B-1)}$, and individually coupling each processing means $N_{A,B}$ in each column with a corresponding processing means $N_{A,B+1}$ in a subsequent column via a vector row subset signal line $L_{VR(B+1)}$ and a matrix row subset signal line $L_{WR(B+1)}$.

14. An array processor as recited in claim 10, wherein each one of said processing means $N_{1,B}$ in said first row of processing means $N_{A,B}$ is coupled to receive said matrix column signal subset $W_C$ substantially simultaneously.

15. An array processor as recited in claim 11, wherein each one of said processing means $N_{A,1}$ in said first column of processing means $N_{A,B}$ is coupled to receive said matrix row signal subset $W_R$ substantially simultaneously.

16. An array processor as recited in claim 10, wherein each one of said processing means $N_{A,B}$ comprises a multiplier-accumulator.

17. An array processor as recited in claim 16, wherein said multiplier-accumulator comprises a digital adder and a digital register.

18. An array processor as recited in claim 10, wherein each one of said processing means $N_{A,B}$ comprises a plurality of digital registers.

19. A multidimensional systolic array processor comprising:

a signal processing array systolically coupled in a PxQ matrix having P rows and Q columns of processing means $N_{A,B}$, where $A \epsilon \{1,2,3, \ldots P\}$ and $B \epsilon \{1,2,3, \ldots Q\}$, to systolically process a matrix signal set W having a plurality of matrix signals $W_{I,J}$ and a vector signal set V having a plurality of vector signals $V_J$, where $I \epsilon \{1,2,3, \ldots M\}$ and $J \epsilon \{1,2,3, \ldots K\}$, said matrix signal set W representing a matrix parameter set selectively represented as an MxK matrix having M rows and K columns of parameters, and said vector signal set V represented as a K-element vector having K parameters, wherein each processing means $N_{1,B}$ in a first one of said rows of processing means $N_{A,B}$ is coupled to receive a vector column signal subset $V_C$ of said vector signal set V, wherein said vector column signal subset $V_C$ includes a first subplurality of said plurality of vector signals $V_J$ and where $$V_C = V_{Y,Z} = V_J$$

where:

$$J = Y - Z - P + \sum_{Z=1}^{Z} (P - Z + 2)$$

$Z = 1, 2, 3, \ldots, Q$
$Y = X, X+1, X+2, \ldots, P$
$X = Z$, for odd $Z$
$\phantom{X} = Z + 1$, for even $Z$, and further wherein each processing means $N_{1,B}$ in a first one of said rows of processing means $N_{A,B}$ is coupled to receive a matrix column signal subset $W_C$ of said matrix signal set W, wherein said matrix column signal subset $W_C$ includes a second subplurality of said plurality of matrix signals $W_{I,J}$ and where $$W_C = W_{A,B,Y,Z}$$

where:

$$\left[ J = Y - Z - P + \sum_{Z=1}^{Z} (P - Z + 2) \right]$$

$Z = 1, 2, 3, \ldots, Q$
$Y = X, X+1, X+2, \ldots, P$
$X = Z$, for odd $Z$
$\phantom{X} = Z + 1$, for even $Z$, and still further wherein said matrix column signal subset $W_C$ is systolically coupled row-to-row within said matrix of processing means $N_{A,B}$, said coupled matrix column signal subset $W_C$ having a third subplurality of said matrix signals $W_{I,J}$ as said matrix column signal subset $W_C$ is coupled from one of said rows of processing means $N_{A,B}$ to a subsequent row of processing means $N_{A+1,B}$, and still further wherein said third subplurality of matrix signals $W_{I,J}$ is smaller than said second subplurality of matrix signals $W_{I,J}$.

20. An array processor as recited in claim 19, wherein each processing means $N_{A,1}$ in a first one of said columns of processing means $N_{A,B}$ is coupled to receive a vector row signal subset $V_R$ of said vector signal set V, wherein said vector row signal subset $V_R$ includes a fourth subplurality of said plurality of vector signals $V_J$ and where $$V_R = V_{Y,Z} = V_J$$

where:

$$J = Z - Y - Q + \sum_{Y=1}^{Y} (Q - Y + 2)$$

$Y = 1, 2, 3, \ldots, P$ $Z = X, X + 1, X + 2, \ldots, Q$ $X = Y$, for even $Y$
$= Y + 1$, for odd $Y$.

21. An array processor as recited in claim 20, wherein each processing means $N_{A,1}$ in a first one of said columns of processing means $N_{A,B}$ is coupled to receive a matrix row signal subset $W_R$ of said matrix signal set W, wherein said matrix row signal subset $W_R$ includes a fifth subplurality of said plurality of matrix signals $W_{I,J}$ and where $$W_R = W_{A,B;Y,Z}$$

where:

$$\left[ J = Z - Y - Q + \sum_{Y=1}^{Y} (Q - Y + 2) \right]$$

$Y = 1, 2, 3, \ldots, P$ $Z = X, X + 1, X + 2, \ldots, Q$ $X = Y$, for even $Y$
$= Y + 1$, for odd $Y$, and further wherein said matrix row signal subset $W_R$ is systolically coupled column-to-column within said matrix of processing means $N_{A,B}$, said coupled matrix row signal subset $W_R$ having a sixth subplurality of said matrix signal $W_{I,J}$ as said matrix row signal subset $W_R$ is coupled from one of said columns of processing means $N_{A,B}$ to a subsequent column of processing means $N_{A,B+1}$, and still further wherein said sixth subplurality of matrix signals $W_{I,J}$ is smaller than said fifth subplurality of matrix signals $W_{I,J}$.

22. An array processor as recited in claim 19, wherein said systolic coupling of said processing means $N_{A,B}$ comprises individually coupling each processing means $N_{A,B}$ in each row with a corresponding processing means $N_{A-1,B}$ in a preceding row via a vector column subset signal line $L_{VC(A-1)}$ and a matrix column subset signal line $L_{WC(A-1)}$, and individually coupling each processing means $N_{A,B}$ in each row with a corresponding processing means $N_{A+1,B}$ in a subsequent row via a vector column subset signal line $L_{VC(A+1)}$ and a matrix column subset signal line $L_{WC(A+1)}$.

23. An array processor as recited in claim 20, wherein said systolic coupling of said processing means $N_{A,B}$ comprises individually coupling each processing means $N_{A,B}$ in each column with a corresponding processing means $N_{A,B-1}$ in a preceding column via a vector row subset signal line $L_{VR(B-1)}$ and a matrix row subset signal line $L_{WR(B-1)}$, and individually coupling each processing means $N_{A,B}$ in each column with a corresponding processing means $N_{A,B+1}$ in a subsequent column via a vector row subset signal line $L_{VR(B+1)}$ and a matrix row subset signal line $L_{WR(B+1)}$.

24. An array processor as recited in claim 19, wherein each one of said processing means $N_{1,B}$ in said first row of processing means $N_{A,B}$ is coupled to receive said vector column signal subset $V_C$ substantially simultaneously.

25. An array processor as recited in claim 20, wherein each one of said processing means $N_{A,1}$ in said first column of processing means $N_{A,B}$ is coupled to receive said vector row signal subset $V_R$ substantially simultaneously.

26. An array processor as recited in claim 19, wherein each one of said processing means $N_{1,B}$ in said first row of processing means $N_{A,B}$ is coupled to receive said matrix column signal subset $W_C$ substantially simultaneously.

27. An array processor as recited in claim 20, wherein each one of said processing means $N_{A,1}$ in said first column of processing means $N_{A,B}$ is coupled to receive said matrix row signal subset $W_R$ substantially simultaneously.

28. An array processor as recited in claim 19, wherein each one of said processing means $N_{A,B}$ comprises a multiplier-accumulator.

29. An array processor as recited in claim 28, wherein said multiplier-accumulator comprises a digital adder and a digital register.

30. An array processor as recited in claim 19, wherein each one of said processing means $N_{A,B}$ comprises a plurality of digital registers.

31. A method of systolically processing a plurality of signal sets, comprising the steps of:
  (a) providing a signal processing array systolically coupled in a PxQ matrix having P rows and Q columns of processing means $N_{A,B}$, where $A \epsilon \{1,2,3, \ldots P\}$ and $B \epsilon \{1,2,3, \ldots Q\}$;
  (b) coupling into said processing array a matrix signal set W having a plurality of matrix signal $W_{I,J}$ representing a matrix parameter set selectively represented as an MxK matrix having M rows and K columns of parameters, where $I \epsilon \{1,2,3, \ldots M\}$ and $J \epsilon \{1,2,3, \ldots K\}$;
  (c) coupling into said processing array a vector signal set V having a plurality of vector signals $V_J$ representing a vector parameter set selectively represented as a K-element vector having K parameters, wherein a vector column signal subset $V_C$ of said vector signal set V is coupled into each processing means $N_{1,B}$ in a first one of said rows of processing means $N_{A,B}$, wherein said vector column signal subset $V_C$ includes a first subplurality of said plurality of vector signals $V_J$ and where $$V_C = V_{Y,Z} = V_J$$

where:

$$J = Y - Z - P + \sum_{Z=1}^{Z}(P - Z + 2)$$

$Z = 1, 2, 3, \ldots, Q$
$Y = X, X + 1, X + 2, \ldots, P$
$X = Z$, for odd $Z$
  $= Z + 1$, for even $Z$; and (d) systolically processing said matrix W and vector V signal sets.

32. A processing method as recited in claim 31, wherein said step (c) of coupling said vector signal set V into said processing array further comprises coupling a vector row signal subset $V_R$ of said vector signal set V into each processing means $N_{A,1}$ in a first one of said columns of processing means $N_{A,B}$, wherein said vector row signal subset $V_R$ includes a second subplurality of said plurality of vector signals $V_J$ and where $$V_R = V_{Y,Z} = V_J$$

where:

$$J = Z - Y - Q + \sum_{Y=1}^{Y}(Q - Y + 2)$$

$Y = 1, 2, 3, \ldots, P$
$Z = X, X + 1, X + 2, \ldots, Q$
$X = Y$, for even $Y$
  $= Y + 1$, for odd $Y$.

33. A processing method as recited in claim 31, wherein said step (c) of coupling said vector signal set V into said processing array further comprises coupling said vector column signal subset $V_C$ into each one of said processing means $N_{1,B}$ in said first row of processing means $N_{A,B}$ substantially simultaneously.

34. A processing method as recited in claim 32, wherein said step (c) of coupling said vector signal set V into said processing array further comprises coupling said vector row signal subset $V_R$ into each one of said processing means $N_{A,1}$ in said first column of processing means $N_{A,B}$ substantially simultaneously.

35. A method of systolically processing a plurality of signal sets, comprising the steps of:
  (a) providing a signal processing array systolically coupled in a PxQ matrix having P rows and Q columns of processing means $N_{A,B}$, where $A \in \{1,2,3, \ldots P\}$ and $B \in \{1,2,3, \ldots Q\}$;
  (b) coupling into said processing array a matrix signal set W having a plurality of matrix signals $W_{I,J}$ representing a matrix parameter set selectively represented as an MxK matrix having M rows of K columns of parameters, where $I \in \{1,2,3, \ldots M\}$ and $J \{1,2,3, \ldots K\}$, wherein a matrix column signal subset $W_C$ of said matrix signal set W is coupled into each processing means $N_{1,B}$ in a first one of said rows of processing means $N_{A,B}$, wherein said matrix column signal subset $W_C$ includes a first subplurality of said plurality of matrix signals $W_{I,J}$ and where $$W_C = W_{A,B,Y,Z}$$

where:

$$\left[ J = Y - Z - P + \sum_{Z=1}^{Z}(P - Z + 2) \right]$$

$Z = 1, 2, 3, \ldots, Q$
$Y = X, X + 1, X + 2, \ldots, P$
$X = Z$, for odd $Z$
  $= Z + 1$, for even $Z$, and further wherein said matrix column signal subset $W_C$ is systolically coupled row-to-row within said matrix of processing means $N_{A,B}$, said coupled matrix column signal subset $W_C$ having a second subplurality of said matrix signals $W_{I,J}$ as said matrix column signal subset $W_C$ is coupled from one of said rows of processing means $N_{A,B}$ to a subsequent row of processing means $N_{A+1,B}$, and still further wherein said second subplurality of matrix signals $W_{I,J}$ is smaller than said first subplurality of matrix signals $W_{I,J}$;

(c) coupling into said processing array a vector signal set V having a plurality of vector signals $V_J$ representing a vector parameter set selectively represented as a K-element vector having K parameters; and
  (d) systolically processing said matrix W and vector V signal sets.

36. A processing method as recited in claim 35, wherein said step of (b) coupling said matrix signal set W into said processing array further comprises coupling a matrix row signal subset $W_R$ of said matrix signal set W into each processing means $N_{A,1}$ in a first one of said columns of processing means $N_{A,B}$, wherein said matrix row signal subset $W_R$ includes a third subplurality of said plurality of matrix signals $W_{I,J}$ and where $$W_R = W_{A,B,Y,Z}$$

where:

$$\left[ J = Z - Y - Q + \sum_{Y=1}^{Y}(Q - Y + 2) \right]$$

$Y = 1, 2, 3, \ldots, P$
$Z = X, X + 1, X + 2, \ldots, Q$
$X = Y$, for even $Y$
  $= Y + 1$, for odd $Y$, and further wherein said matrix row signal subset $W_R$ is systolically coupled column-to-column within said matrix of processing means $N_{A,B}$, said coupled matrix row signal subset $W_R$ having a fourth subplurality of said matrix signals $W_{I,J}$ as said matrix row signal subset $W_R$ is coupled from one of said columns of processing means $N_{A,B}$ to a subsequent column of processing means $N_{A,B+1}$, and still further wherein said fourth subplurality of matrix signals $W_{I,J}$ is smaller than said third subplurality of matrix signals $W_{I,J}$.

37. A processing method as recited in claim 35, wherein said step of (b) coupling said matrix signal set W into said processing array further comprises coupling said matrix column signal subset $W_C$ into each one of said processing means $N_{1,B}$ in said first row of processing means $N_{A,B}$ substantially simultaneously.

38. A processing method as recited in claim 36, wherein said step of (b) coupling said matrix signal set W into said processing array further comprises coupling said matrix row signal subset $W_R$ into each one of said processing means $N_{A,1}$ in said first column of processing means $N_{A,B}$ substantially simultaneously.

39. A method of systolically processing a plurality of signal sets, comprising the steps of:

(a) providing a signal processing array systolically coupled in a PxQ matrix having P rows and Q columns of processing means $N_{A,B}$, where $A \in \{1,2,3, \ldots P\}$ and $B \in \{1,2,3, \ldots Q\}$;

(b) coupling into said processing array a matrix signal set W having a plurality of matrix signal $W_{I,J}$ representing a matrix parameter set selectively represented as an MxK matrix having M rows and K columns of parameters, where $I \in \{1,2,3, \ldots M\}$ and $J \in \{1,2,3, \ldots K\}$, wherein a matrix column signal subset $W_C$ of said matrix signal set W is coupled into each processing means $N_{1,B}$ in a first one of said rows of processing means $N_{A,B}$, wherein said matrix column signal subset $W_C$ includes a first subplurality of said plurality of matrix signals $W_{I,J}$ and where $$W_C = W_{A,B;Y,Z}$$

where:

$$\left[ J = Y - Z - P + \sum_{Z=1}^{Z} (P - Z + 2) \right]$$

$Z = 1, 2, 3, \ldots, Q$
$Y = X, X + 1, X + 2, \ldots, P$
$X = Z$, for odd $Z$
$\quad = Z + 1$, for even $Z$, and further wherein said matrix column signal subset $W_C$ is systolically coupled row-to-row within said matrix of processing means $N_{A,B}$, said coupled matrix column signal subset $W_C$ having a second subplurality of said matrix signals $W_{I,J}$ as said matrix column signal subset $W_C$ is coupled from one of said rows of processing means $N_{A,B}$ to a subsequent row of processing means $N_{A+1,B}$, and still further wherein said third subplurality of matrix signals $W_{I,J}$ is smaller than said second subplurality of matrix signals $W_{I,J}$;

(c) coupling into said processing array a vector signal set V having a plurality of vector signals $V_J$ representing a vector parameter set selectively represented as a K-element vector having K parameters, wherein a vector column signal subset $V_C$ of said vector signal set V is coupled into each processing means $N_{1,B}$ in a first one of said rows of processing means $N_{A,B}$, wherein said vector column signal subset $V_C$ includes a first subplurality of said plurality of vector signals $V_J$ and where $$V_C = V_{Y,Z} = V_J$$

where:

-continued $$J = Y - Z - P + \sum_{Z=1}^{Z} (P - Z + 2)$$

$Z = 1, 2, 3, \ldots, Q$
$Y = X, X + 1, X + 2, \ldots, P$
$X = Z$, for odd $Z$
$\quad = Z + 1$, for even $Z$; and (d) systolically processing said matrix W and vector V signal sets.

40. A processing method as recited in claim 39, wherein said set of (b) coupling said matrix signal set W into said processing array further comprises coupling a matrix row signal subset $W_R$ of said matrix signal set W into each processing means $N_{A,1}$ in a first one of said columns of processing means $N_{A,B}$, wherein said matrix row signal subset $W_R$ includes a fourth subplurality of said plurality of matrix signals $W_{I,J}$ and where $$W_R = W_{A,B;Y,Z}$$

where:

$$\left[ J = Z - Y - Q + \sum_{Y=1}^{Y} (Q - Y + 2) \right]$$

$Y = 1, 2, 3, \ldots, P$ $Z = X, X + 1, X + 2, \ldots, Q$ $X = Y$, for even $Y$
$\quad = Y + 1$, for odd $Y$, and further wherein said matrix row signal subset $W_R$ is systolically coupled column-to-column within said matrix of processing means $N_{A,B}$, said coupled matrix row signal subset $W_R$ having a fifth subplurality of said matrix signals $W_{I,J}$ as said matrix row signal subset $W_R$ is coupled from one of said columns of processing means $N_{A,B}$ to a subsequent column of processing means $N_{A,B+1}$, and still further wherein said fifth subplurality of matrix signals $W_{I,J}$ is smaller than said third subplurality of matrix signals $W_{I,J}$.

41. A processing method as recited in claim 39, wherein said step (b) coupling said matrix signal set W into said processing array further comprises coupling said matrix column signal subset $W_C$ into each one of said processing means $N_{1,B}$ in said first row of processing means $N_{A,B}$ substantially simultaneously.

42. A processing method as recited in claim 40, wherein said step of (b) coupling said matrix signal set W into said processing array further comprises coupling said matrix row signal subset $W_R$ into each one of said processing means $N_{A,1}$ in said first column of processing means $N_{A,B}$ substantially simultaneously.

43. A processing method as recited in claim 39, wherein said step (c) of coupling said vector signal set V into said processing array further comprises coupling a vector row signal subset $V_R$ of said vector signal set V into each processing means $N_{A,1}$ in a first one of said columns of processing means $N_{A,B}$, wherein said vector row signal subset $V_R$ includes a sixth subplurality of said plurality of vector signals $V_J$ and where $$V_R = V_{Y,Z} = V_J$$

where:

$$J = Z - Y - Q + \sum_{Y=1}^{Y} (Q - Y + 2)$$

$Y = 1, 2, 3, \ldots, P$ $Z = X, X + 1, X + 2, \ldots, Q$ $X = Y$, for even $Y$
$\phantom{X} = Y + 1$, for odd $Y$.

44. A processing method as recited in claim 39, wherein said step (c) of coupling said vector signal set V into said processing array further comprises coupling said vector column signal subset $V_C$ into each one of said processing means $N_{1,B}$ in said first row of processing means $N_{A,B}$ substantially simultaneously.

45. A processing method as recited in claim 43, wherein said step (c) of coupling means vector signal set V into said processing array further comprises coupling said vector row signal subset $V_R$ into each one of said processing means $N_{A,1}$ in said first column of processing means $N_{A,B}$ substantially simultaneously.

* * * * *

UNITED STATES PATENT AND TRADEMARK OFFICE
CERTIFICATE OF CORRECTION

PATENT NO. : 5,274,832
DATED : DECEMBER 28, 1993
INVENTOR(S) : EMDADUR R. KHAN

It is certified that error appears in the above-indentified patent and that said Letters Patent is hereby corrected as shown below:

In Col. 13, line 18, delete "f" and replace with --of--.

In Col. 13, line 19, delete "element" and replace with --parameter set selectively represented as a K-element--.

In Col. 15, line 13, after "means" insert --$N_{A,1}$ in a first one of said columns of processing means--.

In Col. 16, line 29, after "V" insert --representing a vector parameter set selectively--.

In Col. 17, line 59, delete "matrix signal" and replace with --matrix signals--.

In Col. 18, line 56, delete "signal" and replace with --signals--.

In Col. 19, line 62, delete "of" and replace with --and--.

In Col. 19, line 64, after "J" insert --$\epsilon$--.

UNITED STATES PATENT AND TRADEMARK OFFICE
CERTIFICATE OF CORRECTION

PATENT NO. : 5,274,832
DATED : DECEMBER 28, 1993
INVENTOR(S) : EMDADUR R. KHAN

It is certified that error appears in the above-indentified patent and that said Letters Patent is hereby corrected as shown below:

In Col. 21, line 18, delete "signal" and replace with --signals--.

In Col. 21, line 51, delete "third" and replace with --second--.

In Col. 21, line 52, delete "second" and replace with --first--.

In Col. 21, line 62, delete "first" and replace with --third--.

In Col. 22, line 43, delete "third" and replace with --fourth--.

Signed and Sealed this

Thirty-first Day of May, 1994

*Attest:*

BRUCE LEHMAN

*Attesting Officer*     *Commissioner of Patents and Trademarks*